United States Patent
Raymond et al.

(10) Patent No.: US 10,901,191 B2
(45) Date of Patent: Jan. 26, 2021

(54) METHOD OF FABRICATING ARRAYS OF INDIVIDUALLY ORIENTED MICRO MIRRORS FOR USE IN IMAGING SECURITY DEVICES

(71) Applicant: LUMENCO, LLC, Englewood, CO (US)

(72) Inventors: Mark A. Raymond, Littleton, CO (US); Hector Andres Porras Soto, Littleton, CO (US); Howard G. Lange, San Diego, CA (US)

(73) Assignee: LUMENCO, LLC, Englewood, CO (US)

( * ) Notice: Subject to any disclaimer, the term of this patent is extended or adjusted under 35 U.S.C. 154(b) by 190 days.

(21) Appl. No.: 16/203,128

(22) Filed: Nov. 28, 2018

(65) Prior Publication Data

US 2019/0092084 A1    Mar. 28, 2019

Related U.S. Application Data

(62) Division of application No. 15/162,113, filed on May 23, 2016, now Pat. No. 10,189,294.

(Continued)

(51) Int. Cl.
*G02B 17/00* (2006.01)
*B42D 25/425* (2014.01)
(Continued)

(52) U.S. Cl.
CPC .......... *G02B 17/002* (2013.01); *B42D 25/29* (2014.10); *B42D 25/324* (2014.10);
(Continued)

(58) Field of Classification Search
CPC .... B42D 25/373; B42D 25/29; B42D 25/378; B42D 25/21; B42D 25/351; B42D 25/23;
(Continued)

(56) References Cited

U.S. PATENT DOCUMENTS

| 5,105,306 A | 4/1992 | Ohala |
| 6,288,842 B1 | 9/2001 | Florczak |

(Continued)

FOREIGN PATENT DOCUMENTS

| DE | 102010048262 A1 | 4/2012 |
| EP | 1966769 B1 | 11/2014 |

(Continued)

*Primary Examiner* — Jade R Chwasz
(74) *Attorney, Agent, or Firm* — Snell & Wilmer L.L.P.; Kent A. Lembke

(57) ABSTRACT

A visual display assembly useful as an authentication or anti-counterfeiting element. The assembly includes a substrate and, on a surface of the substrate, an array of micro mirrors receiving ambient light. Each mirror includes a reflective surface to reflect the ambient light to display an image that appears to float in a plane, which is spaced a distance apart from the surface of the substrate. The image includes a plurality of pixels, and the array of micro mirrors includes for each of the pixels a set of the micro mirrors each having a reflective surface oriented to reflect the ambient light toward a point on the plane corresponding to one of the pixels. Each of the sets of the micro mirrors includes a plurality of the micro mirrors, and the reflected ambient light each set of micro mirrors intersects to illuminate or write a pixel of an image.

12 Claims, 20 Drawing Sheets

Related U.S. Application Data

(60) Provisional application No. 62/262,767, filed on Dec. 3, 2015.

(51) Int. Cl.
| | | |
|---|---|---|
| *B42D 25/324* | (2014.01) | |
| *B42D 25/351* | (2014.01) | |
| *B42D 25/328* | (2014.01) | |
| *B42D 25/29* | (2014.01) | |
| *B42D 25/373* | (2014.01) | |
| *B42D 25/378* | (2014.01) | |
| *G02B 27/00* | (2006.01) | |

(52) U.S. Cl.
CPC ......... *B42D 25/328* (2014.10); *B42D 25/351* (2014.10); *B42D 25/373* (2014.10); *B42D 25/378* (2014.10); *B42D 25/425* (2014.10); *G02B 27/0012* (2013.01)

(58) Field of Classification Search
CPC ...... B42D 25/24; B42D 25/41; B42D 25/435; B42D 25/00; B42D 25/20; B42D 25/40; B42D 25/45; B42D 2033/20; B42D 2035/20; B42D 2035/24; G02B 17/002; G02B 27/0012; G02B 17/00
USPC ................................ 359/851, 852, 853, 855
See application file for complete search history.

(56) References Cited

U.S. PATENT DOCUMENTS

| | | | |
|---|---|---|---|
| 6,695,455 | B1 | 2/2004 | Su |
| 7,261,417 | B2 | 8/2007 | Cho et al. |
| 9,176,266 | B2 | 11/2015 | Fuhse et al. |
| 2002/0114078 | A1 | 8/2002 | Halle et al. |
| 2005/0057812 | A1 | 3/2005 | Raber |
| 2008/0112056 | A1* | 5/2008 | Raymond .............. G02B 30/27 359/619 |
| 2008/0258456 | A1 | 10/2008 | Rahm et al. |
| 2008/0258457 | A1* | 10/2008 | Commander .......... B42D 25/29 283/107 |
| 2010/0208036 | A1* | 8/2010 | Kaule ...................... B44F 1/10 348/46 |
| 2010/0231860 | A1 | 9/2010 | Maekawa |
| 2012/0098249 | A1* | 4/2012 | Rahm .................... B42D 25/21 283/85 |
| 2013/0038942 | A1 | 2/2013 | Holmes |
| 2014/0268327 | A1 | 9/2014 | Dunn et al. |
| 2015/0183258 | A1 | 7/2015 | Raymond et al. |

FOREIGN PATENT DOCUMENTS

| | | |
|---|---|---|
| EP | 2760677 B1 | 1/2016 |
| WO | 2011012460 A2 | 2/2011 |
| WO | 2012048847 A1 | 4/2012 |
| WO | 2012000669 A1 | 5/2012 |
| WO | 2013045054 A1 | 4/2013 |
| WO | 2013056825 A1 | 4/2013 |

* cited by examiner

| CALCULATED RESULTS | | |
|---|---|---|
| 50 | N DARK PIXELS | 1400 |
| 50 | N WHITE PIXELS | 3650 |
| 2500 | N MISSING PIXELS | -2550 |
| 254 | N DARK MIRRORS GENERATED | 31814 |
| 254 | N WHITE MIRRORS GENERATED | 32702 |
| 64516 | N UNUSED MIRRORS | 0 |
| 12700 | FUTURE | FUTURE |
| 12700 | FUTURE | FUTURE |
| 12700 | PIXEL N IN X | 25 |
| 12700 | PIXEL N IN Y | 25 |
| 0 | NUM OF MIRRORS FOR ABOVE PIXEL | 9019 |
| 25.8064 | MIRROR N IN X | 127 |
| 13.0808 | MIRROR N IN Y | 127 |
| 64516 | NUM OF PIXELS FOR ABOVE MIRROR | 349 |
| 32702 | | |
| 31814 | | |
| 27.928 | | |
| GEN 3D MAS | | |
| #2 TEST X HALF WHITE LEVEL2 | | |
| 1 | | |

PLOT PARAMETERS FOR 3D VIEW
☐ SAVE PLOT DATA

CROSS SECTION SELECTIONS
○ NOT USED ○ OXY PLANE RAYS ◉ OXZ PLANE RAYS ○ OYZ PLANE RAYS

| | | |
|---|---|---|
| EYE LOCATION XYZ (z=18 INCH 457200 MICRONS) | 19350 | 6450 | 457200 |
| EYE FOCAL LENGTH (22MM 22000 MICRONS) | 21200 | | |
| EYE INDEX OF REFRACTION (1.333) | 1.333 | | |
| EYE APERTURE (6.5 MM 6500 MICRONS) | 6500 | | |
| EYE LENS RADIUS (5.55MM 5550 MICRONS) | 5550 | | |
| NUMBER OF RAYS TO TRACE PER MIRROR (<10,000) | 15 | | |
| CONE ANGLE OF MIRROR TRACE (DEG) | 0.2 | | |

☑ PLOT TRACED RAY INTERSECTIONS
☑ PLOT CAPTIONS
☐ PLOT MIRRORS
☐ PLOT PIXEL CONES
☐ PLOT MIRROR BOUNDARY
☐ PLOT GRID

RETINA PLOT SELECTIONS
○ USE PLOT 1
○ USE PLOT 2
◉ USE PLOT 3
○ USE PLOT 4

| | |
|---|---|
| 3D X WIDTH | 200000 |
| 3D Y HEIGHT | 200000 |
| 3D X WIDTH | 900000 |
| 3D Y HEIGHT | 900000 |
| 3D X WIDTH | 1000 |
| 3D Y HEIGHT | 1000 |

EYE CROSS SECTION
○ EYE PLOT 1
○ EYE PLOT 2

| EYE PLOT L 1 | -15000 |
| EYE PLOT R | 15000 |
| EYE PLOT B | 450000 |
| EYE PLOT T | 480000 |
| EYE PLOT L 2 | -3000 |
| EYE PLOT R | 3000 |
| EYE PLOT B | 7000 |
| EYE PLOT T | 13000 |

METHOD OF FABRICATING ARRAYS OF INDIVIDUALLY ORIENTED MICRO MIRRORS FOR USE IN IMAGING SECURITY DEVICES

CROSS-REFERENCE TO RELATED APPLICATIONS

This application is a divisional of U.S. patent application Ser. No. 15/162,113, filed May 23, 2016, that claims the benefit of U.S. Provisional Application No. 62/262,767, filed Dec. 3, 2015, which are both incorporated herein by reference in their entireties.

BACKGROUND

1. Field of the Description

The present invention relates, in general, to anti-counterfeiting devices for currency and brand authentication, and, more particularly, to currency and brand authentication elements, and methods of designing and manufacturing such authentication elements, that are configured to provide a multi-planar image that is viewable without special eyewear and that is difficult, if not nearly impossible, to replicate or copy.

2. Relevant Background

Anti-counterfeiting efforts often involve use of an anti-counterfeiting device or element that is made up of an array of lenses and an image printed onto the back of the lens array or onto an underlying substrate or surface (e.g., a sheet of paper or plastic). The anti-counterfeiting element may be used to display an image that is chosen to be unique and be an indicator that the item carrying the anti-counterfeiting element is not a counterfeit. The anti-counterfeiting market is rapidly growing worldwide with anti-counterfeiting elements placed on a wide range of items such as upon currency (e.g., on a surface of a paper bill to help prevent copying) and on labels for retail products (e.g., labels on clothing showing authenticity).

In this regard, moiré patterns have been used for years in anti-counterfeiting elements with arrays of round lenses and with arrays of hexagonal lenses (or round and hexagonal lens arrays). Typically, the printed images provided in an ink layer under these lens arrays are small, fine images relative to the size of the lenses. A moiré pattern is provided in the printed images in the form of a secondary and visually evident superimposed pattern that is created when two identical patterns on a surface are overlaid while being displaced or rotated a small amount from each other.

In such moiré pattern-based anti-counterfeiting elements, some of the images may be printed in a frequency slightly more or less frequent than the one-to-one dimension of the lenses in two axes, and some of the images may be printed slightly differently relative to each other. While helpful to reduce counterfeiting, use of moiré patterns with round lens arrays has not been wholly satisfactory for the anti-counterfeiting market. One reason is that the effects that can be achieved with moiré patterns are limited, and the effect is often relatively easy to reverse engineer, which limits its usefulness as an anti-counterfeiting element. For example, printing the underlying image is becoming easier to accomplish due to high resolution lasers and setters and other printing advances. Typically, for an element, the micro-lenses are printed using an emboss and fill technology, which limits the printing to one color due to the fact that the process tends to be self-contaminating after one color and also due to the fact that the process is difficult to control from a relative color-to-color pitch in the emboss-and-fill printing process.

In other cases, holograms and lens features are used for security devices in currency, brand authentication and brand protection as well as on high security documents. Holograms are becoming increasingly less secure, in part, due to the rise in technology, programming, and general availability of programs that allow one to easily create holograms. In many applications, the cheaper dot matrix holograms are "good enough" to simulate many of the effects of the more expensive elaborate holograms used in anti-counterfeiting elements. While lens features done properly can be more secure than hologram elements, there is a need for new technology to combat the currency and product counterfeiting. Ideally, new technology would have attributes that are not possible with holography or micro-lenses.

Hence, there remains a need for advancements in the design and fabrication of assemblies or elements that display imagery useful for anti-counterfeiting and/or product/document authentication. For example, such improvements may allow new anti-counterfeiting devices or elements to be produced for use with currency, labels, credit/debit cards, and other items, and these anti-counterfeiting devices preferably would be much more difficult if not nearly impossible to duplicate or copy. Further, there is a growing demand for such anti-counterfeiting devices to provide a surprising or "wow factor" with their displayed imagery such as images that float above and/or below a focal plane (e.g., more true 3D displays) rather than merely laterally reflecting back light such as with a sequence of mirrors or mirrored surface or using reproducible holograms.

SUMMARY

Briefly, the inventors recognized that an anti-counterfeiting or security device can be provided that is configured to "write" images with light in one, two, or more spatial planes above and below the surface of an array of micro mirrors. Each of the micro mirrors is oriented (or "programmed") to act with a number of other such micro mirrors (e.g., a "set of pixel-providing micro mirrors") as one pixel in the written image(s) as the set of micro mirrors each directs its reflected light to a particular location in the image(s) display plane(s) (e.g., an apex of a cone with each of the micro mirrors in the set of pixel-providing micro mirrors being within the base of the cone) that when viewed with a number of other such pixels (each provided by a different set of pixel-providing micro mirrors) makes up a written image in one or more spaced apart image display planes.

In other words, text, imagery, and so forth can be written with ambient light by focusing the micro-mirrors to different spatial planes above the plane of the security device (which is typically provided on a surface of a document (e.g., currency) or product being authenticated with the security device). Conversely, the technology can then "reverse" to the viewer by having the "bright" pixels go to "dark" and the backgrounds reverse from "light' to "dark" with a change of perspective (e.g., occurring when the viewer changes their viewing angle or rotates the document/product containing the security device).

Also, since the technology is made of mirrors (made from thin aluminum, silver or gold depositions on an upper surface of the document/product on which the security element is provided (e.g., any supporting substrate)), the anti-counterfeiting or security device will work from two sides in a film process (e.g., when the supporting substrate is transparent). This type of two-sided or two-view image cannot be done with holography or other presently available anti-counterfeiting technologies. The technology can be embossed into films, metallized, and then processed into currency threads, foil stamps, labels and packaging. It can also be directly stamped onto coins or other metallic surfaces (e.g., provided on nearly any supporting substrate). Color can also be added to the displayed or "written" image(s) by using a reflective ink printing method or with the use of dielectric nanostructures (e.g., with plasmonic resonance and/or other techniques).

More particularly, a visual display assembly is provided that is useful as a security element on paper and coin currency, product labels, and other objects. The assembly includes a substrate (which may be part of the object upon which the security element is provided such as a piece of currency or a product label). The assembly also includes, on a surface of the substrate, an array of micro mirrors receiving ambient light and, in response, displaying an image in a plane spaced a distance apart from the surface of the substrate. The image includes or is "written" with a plurality of pixels, and the array of micro mirrors includes for each of the pixels a set of the micro mirrors each having a reflective surface oriented to reflect the ambient light toward a point on the plane corresponding to one of the pixels.

In some embodiments, each of the sets of the micro mirrors includes at least twenty of the micro mirrors (e.g. a number in the range of 20 to 40 such as about 30 mirrors). To provide a "bright" or light pixel, the reflected ambient light from the twenty or more micro mirrors intersects or crosses at (or passes near to) the point corresponding to the one of the pixels (e.g., each pixel is displayed or lit by beams/rays from reflective surfaces of the micro mirrors crossing at a common point on the image display plane). The point on the plane may correspond to an apex of a cone, and the twenty or more micro mirrors can be located within a base of the cone coplanar with the surface of the substrate. The micro mirrors within the base of the cone but excluded from (or not included in or used for) the set of the micro mirrors displaying the pixel are oriented to reflect the ambient light away from point on the plane corresponding to the pixel to provide a dark background for the image.

The assembly may be configured to display images in more than one image display plane or in two or more levels/layers. In this regard, the array of mirrors may be configured to behave further in response to the receiving of the ambient light to display a second image in a second plane spaced a distance apart from the plane displaying the image. The second image may be provided or "written" with a plurality of pixels (as was the case with the first image). The array of micro mirrors includes, for each of the pixels of the second image, a set of the micro mirrors each having a reflective surface oriented to reflect the ambient light toward a point on the second plane corresponding to one of the pixels of the second image. The first image has a first viewing angle and the second image has a second viewing angle offset from the first viewing angle by at least 10 degrees (such as an offset angle in the range of 10 to 45 degrees with offset angles of 20 to 30 degrees being useful in some embodiments).

In some particular implementations, the substrate is transparent, whereby the image is displayed to be spaced apart the distance from a first side of the substrate and further whereby a second image including a second set of pixels is displayed by the array of micro mirrors to be spaced apart a second distance from a second side of the substrate opposite the first side. In this manner, the array of micro mirrors can be said to be completely functional on the reverse side of the substrate (or film) to present a mirror image or a reverse image (in the image plane) to the viewer on the opposite side of the substrate.

In the same or other embodiments, the micro mirrors are rectangular (e.g., square) with a smallest side having a length of at least 35 microns such as 50 microns or more while other embodiments use mirrors that are circular with a diameter of at least 35 microns (e.g., 50 microns or larger in diameter). In practice, the plane in which the image is displayed may be above, below, or coinciding with the focal plane for the array of the micro mirrors. Also, the image may be displayed using only (or mostly) white light (and off or dark pixels) or the micro mirrors may be configured to display the image with colors (in addition to white). This may be achieved with at least one of ink, plasmonic resonance, and dielectric material being used to configure the micro mirrors to display the image with the desired colors.

BRIEF DESCRIPTION OF THE DRAWINGS

FIGS. 8A and 8B illustrate a micro mirror design GUI that can be displayed on a monitor or display by the design program;

FIG. 11 illustrates a representative GUI or ray tracing menu that allows a user to specify parameters to utilize in performing the ray tracing;

DETAILED DESCRIPTION

Figure 1:
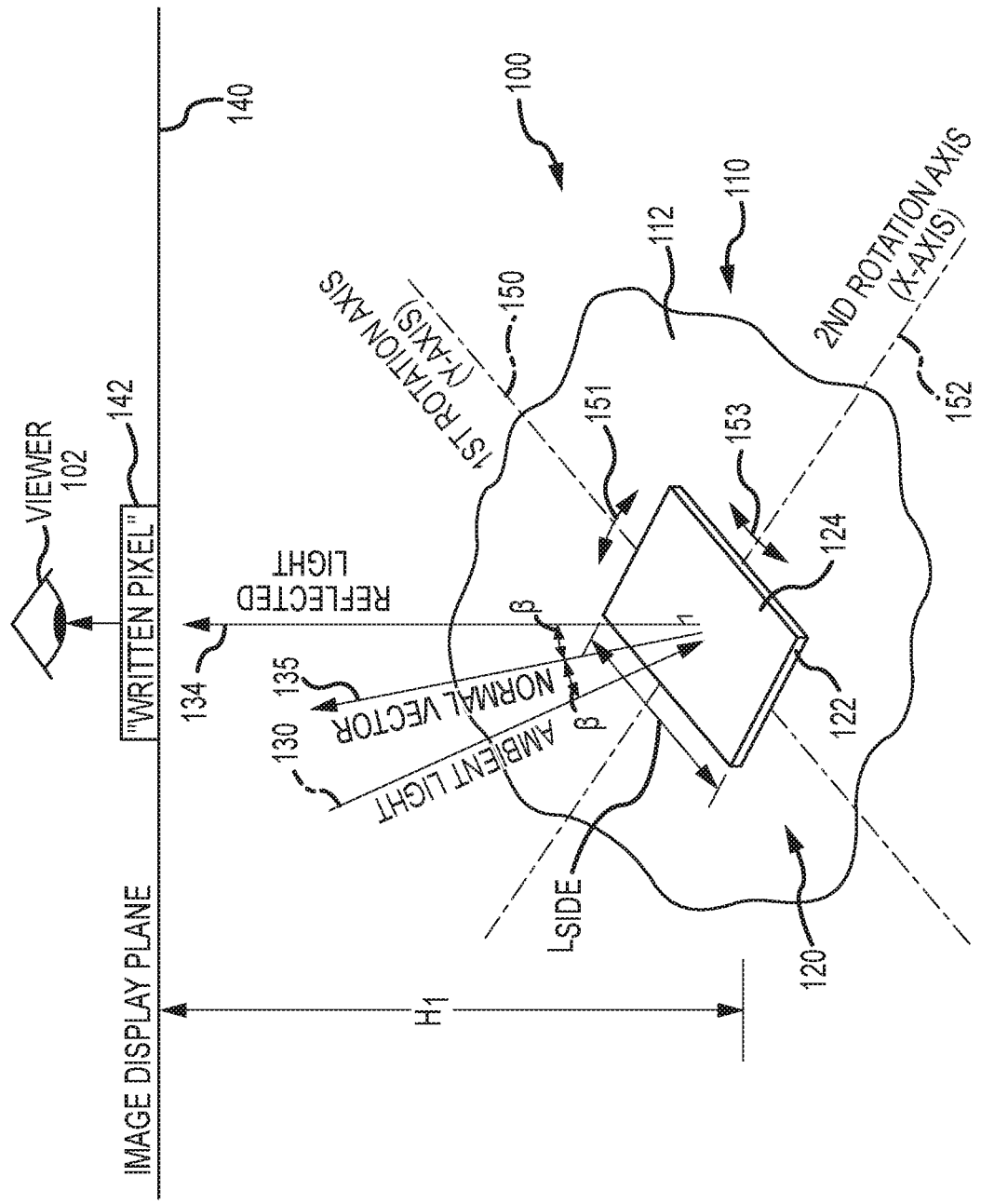
FIG. 1 is a top perspective, partial view of a visual display assembly for use as an anti-counterfeiting element or device showing a single micro mirror that would be provided in an array of such micro mirrors.

Briefly, the present description is directed toward visual display assemblies that can be used as anti-counterfeiting or authentication elements or devices such as on currency, coins, documents, products, and so on. Each visual display assembly includes an array of a large number of micro mirrors, and this array can be provided on a surface of nearly any supporting substrate (e.g., a surface of a piece of currency, on a coin, on a surface of a product or its sales/identification label, and so on). Sets (or subsets) of the micro mirrors are used to work in unison to "write" pixels of images in one, two, or more image display planes above the supporting substrate by having each of the micro mirrors in each of the pixel-providing sets direct light striking its first or upper reflective surface to a location of a pixel in one of the image display planes. The sets of pixels may be configured to provide angular offset viewing (e.g., by an offset angle in the range of 15 to 35 degrees or the like with 20 degrees used in some cases between the viewing angles of the written images of each adjacent image display plane) in the different image display planes such that a viewer typically only observes or perceives the written pixels of one image display plane at a time (or at a single viewing angle or perspective) and switching occurs as the viewer changes their viewing angle or rotates the substrate supporting the visual display assembly and its many micro mirrors.

The visual display assembly (or security element/device) is designed to create a floating image(s) of pixels, and the pixel-providing sets of micro mirrors are chosen to have a large enough number to effectively display a great enough quantity of light to allow a viewer to perceive each separate, floating pixel in the written or displayed image. The number of micro mirrors used in each set may vary due to a large number of parameters such as material used to provide the reflective upper surface, size of each micro mirror (e.g., with 35 to 100 micron mirrors used in some implementations and 50 micron mirrors used in one prototype of the present invention), and the like. Each of these micro mirrors in each pixel-providing set is oriented to try to have all of these micro mirrors direct their reflected light to intersect at a point (the written pixel of the displayed image) in an image display plane above the supporting substrate, and each pixel of the written image is either on or off (or providing light or no light) at various viewing angles.

A basic or underlying idea of the micro mirror-based visual display assembly is to use ambient light and a plane (an upper surface of a supporting substrate) containing many, small mirrors. The ambient light that is reflected off the mirrors is aimed or targeted toward desired points (or pixels) above the plane that contains the mirrors. The image displayed by all the pixel-providing sets of micro mirrors targeting a first image display plane above the supporting substrate may be considered a first layer image. The first layer image can be defined by artwork that has light or dark pixels to be produced in this first layer (or a multi-layer image) or first image display plane. To this end, the mirrors in a pixel-providing set of micro mirrors are carefully selected from the micro mirror array as being within a circle (or cone base) defined by the intersection of the cone defined by an apex angle and a pixel from the desired image display plane/layer (e.g., the first image display plane) that is chosen to coincide with the apex of the cone. Each of these mirrors (which are in the base of the cone) is then aimed or targeted (or "oriented") toward the cone apex (image's pixel) so that the resulting effect is a point source of light floating a height or distance above (or below in some cases) the plane of the supporting surface containing the array of micro mirrors at the location of the pixel.

Prior to explaining a design or configuration of an entire array of micro mirrors in a visual display assembly, it may be useful to first look at a single one of these mirrors. FIG. 1 illustrates a portion of a visual display assembly 100 (or a substrate with a security element or device) according to the present description. As shown, a supporting substrate 110 with a surface 112 is provided that receives and supports a micro mirror 120. For example, the substrate 110 may be a piece of currency, a coin, a product label, a document, a credit/debit/bank card, or the like for which it is desired to provide anti-counterfeiting or authentication functionality with the visual display assembly or security element 100. The micro mirror 120 is shown to include a body (or lower layer/surface) 122 that is affixed to or integrally formed with the surface 112 of the substrate 110. The view in FIG. 1 is only "partial" as it will be understood that the assembly 100 typically would include many (e.g., hundreds to many thousands) of the micro mirrors 120 (i.e., an array of micro mirrors 120). Each of such micro mirrors 120 is individually oriented or "programmed" as discussed below such that the micro mirrors 120 of the array act together to display one or more floating images made up of a plurality of pixels in one or more image display planes above the substrate surface 112.

The micro mirror 120 also includes an upper (or exposed) reflective surface 124 facing away from the surface 112 of the supporting substrate 110. This surface 124 is reflective as the micro mirror 120 typically will be formed of a metal or metallic compound or other material chosen for its reflective properties. For example, the micro mirror 120 may be a thin layer of aluminum, silver, gold, or the like provided by deposition upon the surface 112 of the substrate 110. When the image display assembly 100 is in use, ambient light 130 strikes the reflective upper surface 124 of the micro mirror 120 and is reflected as shown at 134 from the upper surface 124. Particularly, the micro mirror's upper surface 124 is to have a normal vector 135 (e.g., as may be defined as output of a design program with X, Y, and Z coordinates), and the incoming ray 130 and the normal vector 135 from the same angle, $\beta$, as is formed between the normal vector 135 and the reflected light 134.

The reflected light 134 is preferably directed or aimed so as to cross an image display plane 140, which is spaced apart a height, $H_1$, above or away from the substrate surface 112 (and reflective surface 124 which may be substantially coplanar due to the small thickness of the body 122), at a location (X-Y-Z coordinates may define this location relative to the surfaces 112 and 124) coinciding with or defining one of a plurality of written pixels 142 of an image displayed by the assembly 100 in the plane 140. While not shown, a plurality of other micro mirrors configured similar to mirror 120 would also reflect their received ambient light to the point/pixel 142 in the plane 140 (a plurality of reflected light beams from micro mirrors would intersect at the point/pixel 142) so as to provide a point source of light at 142 viewable by a viewer 102.

To provide this desired reflection of light 134, the micro mirror 120 is oriented or has its reflective surface 124 oriented in a particular, predefined (e.g., by a visual display assembly configuration computer program or algorithm) manner. Particularly, each micro mirror 120 may be individually oriented by rotating its body 122 (or surface 124) about one or both of first and second rotation axes 150, 152 as shown with arrows 151, 153 during design processes (prior to fabrication). Then, the micro mirror 120 may be formed with these design parameters so that the reflective upper surface 124 (with its known location in the array of micro mirrors by X-Y coordinates of its center) is oriented (at first and second angles) relative to the two axes 150, 152 to have its normal vector 135 aimed or targeted in a particular manner (X-Y-Z coordinates of the normal vector for the mirror 120), e.g., to have ambient light 130 reflected as shown at 134 to cross the image display plane 140 at the location of the pixel 142. As noted above, the size (and shape) of each micro mirror 120 may be varied to practice the invention with some embodiments utilizing square-shaped bodies 122 that have sides with a length, $L_{Side}$, that is typically greater than about 35 microns (such as 50 microns) and often in the range of 40 to 60 microns while some embodiments may use larger micro mirrors.

Figure 2:
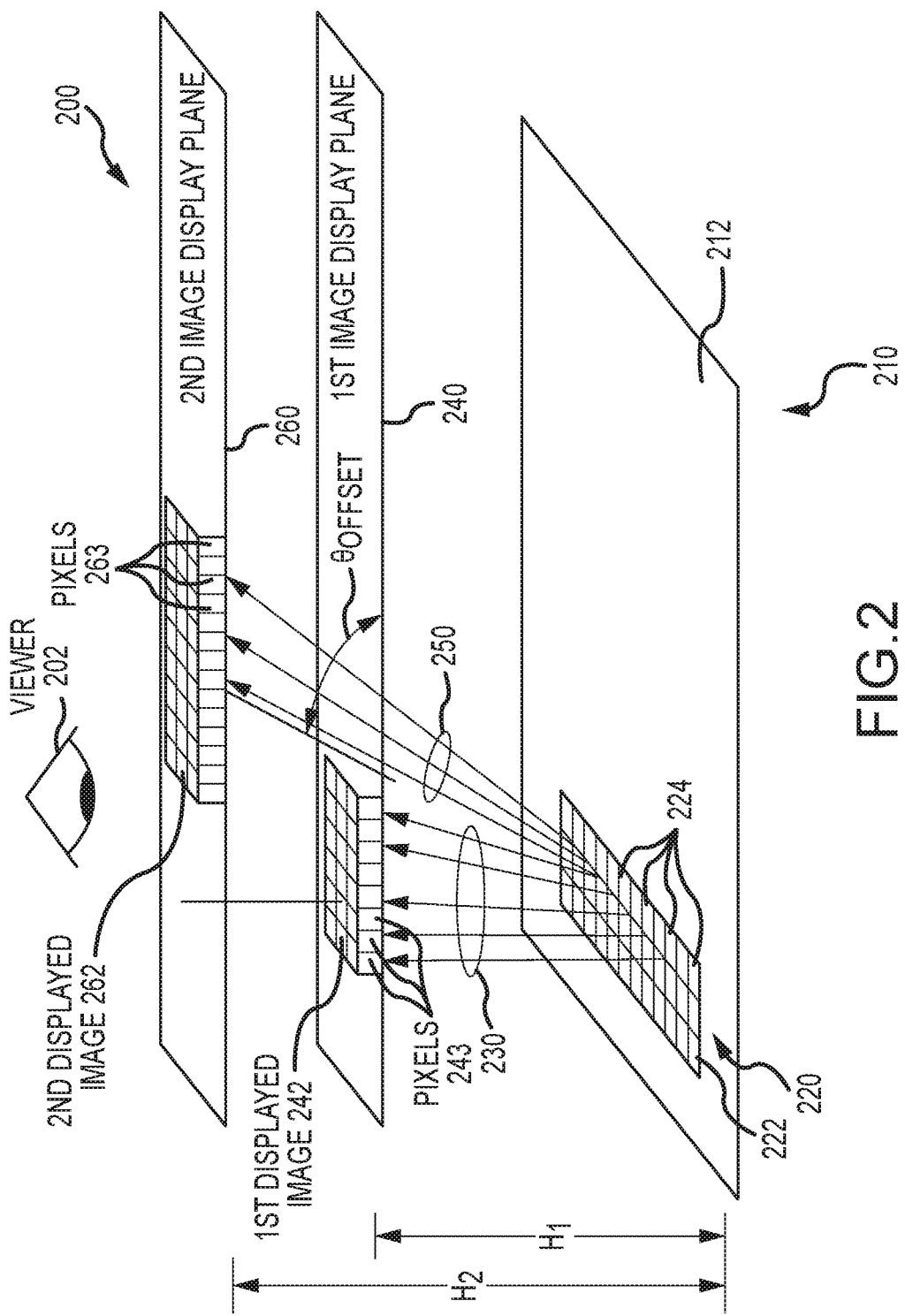
FIG. 2 is a side view (e.g., a functional schematic) of an object (such as currency, a document, a financial card, or the like) including an anti-counterfeiting or authentication (or security) element/device of the present description.

FIG. 2 is a side view (e.g., a functional schematic) 200 of an object (such as currency, a document, a financial card, or the like) 210 including an anti-counterfeiting or authentication (or security) element/device 220 of the present description. The object or substrate 210 includes an upper or first surface 212 upon which is provided or formed the security device 220 (which may take the form of the visual display assembly 100 of FIG. 1). The security device 220 has an exposed or upper surface 222 that is configured to provide an array of micro mirrors 224, which may be individually oriented to provide reflection of ambient light striking the surface 222 of the security element 220 so as to display one or more floating images that can be observed by a viewer 202 to authenticate the object 210.

To this end, a first number of the micro mirrors 224 may be configured to provide sets of pixel-providing micro mirrors that reflect ambient light as shown with arrows 230 to "write" or display a first displayed image 242 made up of a plurality of pixels 243 (with each of these pixels 243 associated with one of the sets of pixel-providing micro mirrors 224). A second number of the micro mirrors 224 is configured to provides sets of pixel-providing micro mirrors that reflect ambient light as shown with arrows 250 to "write" or display a second displayed image 262 made up of a plurality of pixels 263 (with each of these pixels 263 being associated or written by one of the sets of pixel-providing micro mirrors 224). As discussed with reference to FIG. 1, each of the micro mirrors 224 in the same set of pixel-providing micro mirrors 224 used to create/write a particular pixel 243, 263 in one of the images 242, 262 is configured or oriented with its reflective surface oriented (with rotation relative to one and/or two rotation axes) to target or direct a point/location on the plane 240 or 260 coinciding with the pixel 243, 263. This, in most embodiments, coincides with an apex of a cone with each of the pixels 243, 263 in the set of micro mirrors 224 being in the base of the cone (e.g., within the circular area on the surface 222 defined by the cone base). Note, each of these micro mirrors 224, though, is oriented uniquely and differently to provide the reflected light 230, 250 along a normal vector to its reflective surface.

To the viewer 202, the first displayed image 242 appears to float in the first image display plane 240 that is a height, $H_1$, above the surface 212 of the object/substrate 210 while the second displayed image 262 appears to float in the second image display plane 260 that is a different (typically greater) height, $H_2$, above the surface 212. The micro mirrors 224 are oriented so that the pixels 243 of the first image 242 are a viewing angle offset, $\theta_{Offset}$, (e.g., 10 to 30 degrees or the like) from the pixels 263 of the second image 262 so that the viewer 202 typically only views one of the floating images 242, 262 at a time (at a range of viewing angles).

Figure 3:
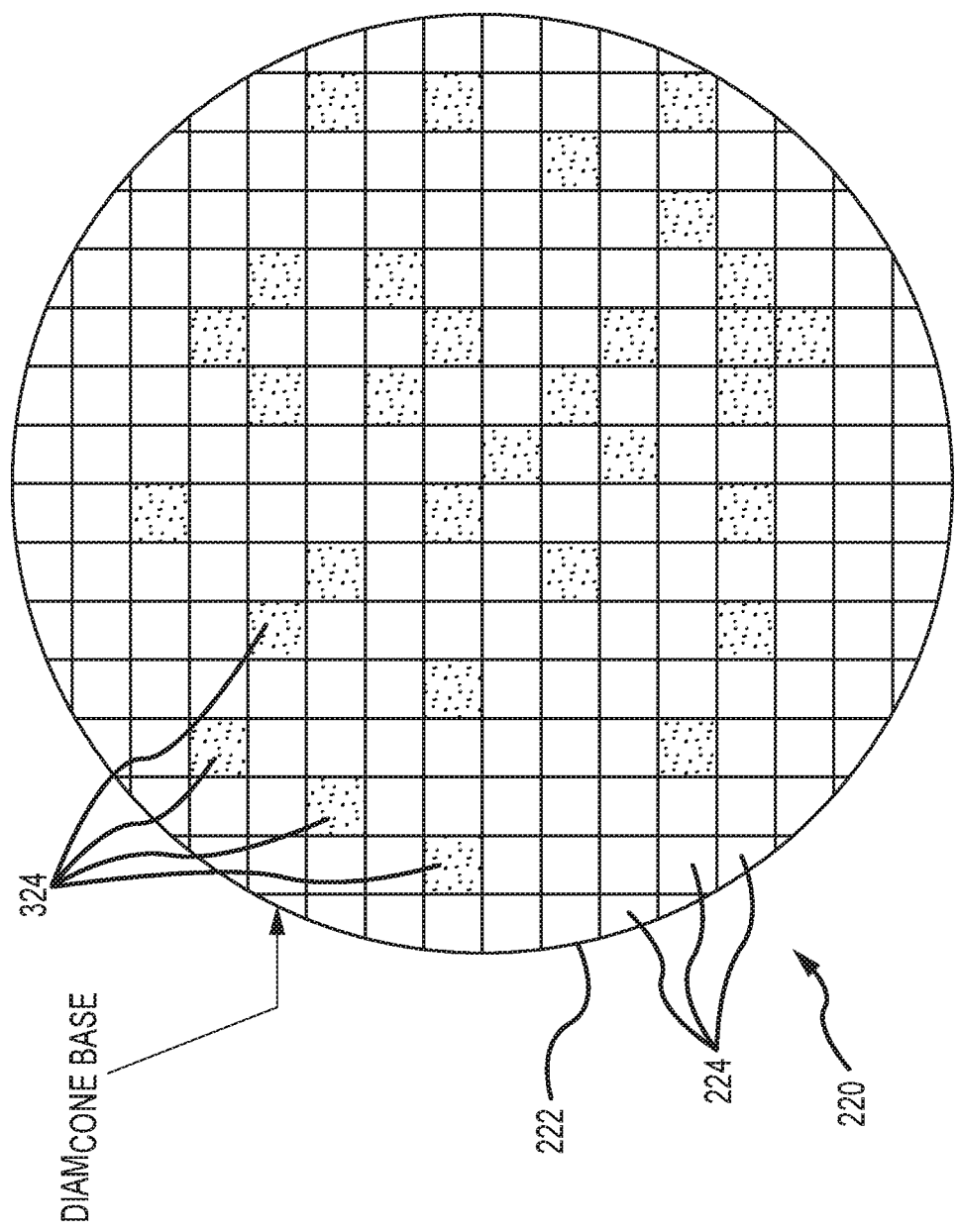
FIG. 3 is an enlarged view of a subset of the micro mirrors of the security element of FIG. 2 corresponding to micro mirrors in an area of one cone base associated with one cone apex or written pixel in one of the displayed/written images provided by the security element of FIG. 2.

As discussed above, micro mirrors for each set of pixel-providing micro mirrors are chosen from a set of available micro mirrors located within an area on the security element surface (or substrate surface) that corresponds with a base of the cone with an apex coinciding with the pixel being created by these micro mirrors. FIG. 3 is an enlarged view of a subset of the micro mirrors 224 on the surface 222 of the security element 220 of FIG. 2, which correspond to micro mirrors 224 in an area of one cone base with diameter, $Diam_{Cone\ Base}$, associated with one cone apex or written pixel 243 or 263 in one of the displayed/written images 242 or 262 provided by the security element 220.

FIG. 3 illustrates all the available micro mirrors 224 in the cone base, but the security element 220 typically is designed so that only a subset of these available mirrors 224 (such as 20 to 40 or more with 30 shown in use in FIG. 3 at 324) are used to write or display a particular pixel. The unused mirrors 224 typically are oriented to reflect received ambient light away from the location of the pixel being written/created by the chosen mirrors 324, which may be considered as providing a mask with the unused mirrors 224. The chosen mirrors 324 (or mirrors in the set of pixel-providing micro mirrors) are shown with shading/patterning that would not be actually present in a security element but that is useful for differentiating these mirrors 324 from the other/unused ones of the mirrors 224.

As will be explained below, the micro mirrors 324 in the set of pixel-providing micro mirrors are randomly chosen such that the mirrors 324 do not provide an obvious, regular pattern and each pixel's set of micro mirrors 224 likely will have a very different pattern within a cone base or circular area of the surface 222 of the security element 220. Also, each of the micro mirrors 324 in the set used to provide a particular pixel 243 or 263 will be differently oriented so as to have the normal vectors of all the mirrors 324 intersect at the X-Y-Z coordinates of the same pixel 243 or 263 in the appropriate one of the image display planes 240 or 260.

Significantly, the mirrors 324 are not pointing toward a viewer but, instead, are aimed or targeted toward the intersection point (or pixel coordinates) in the image display plane or layer. The use of sets of micro mirrors to provide or create floating pixels that in combination can write or display an image in one, two, or more layers is effective in providing a displayed image with depth and with high contrast. Further, the image appears to switch from light to dark with rotation of the object/substrate with the security element (or with movement of the viewer's eyes to change their viewing angle or perspective).

Figure 4:
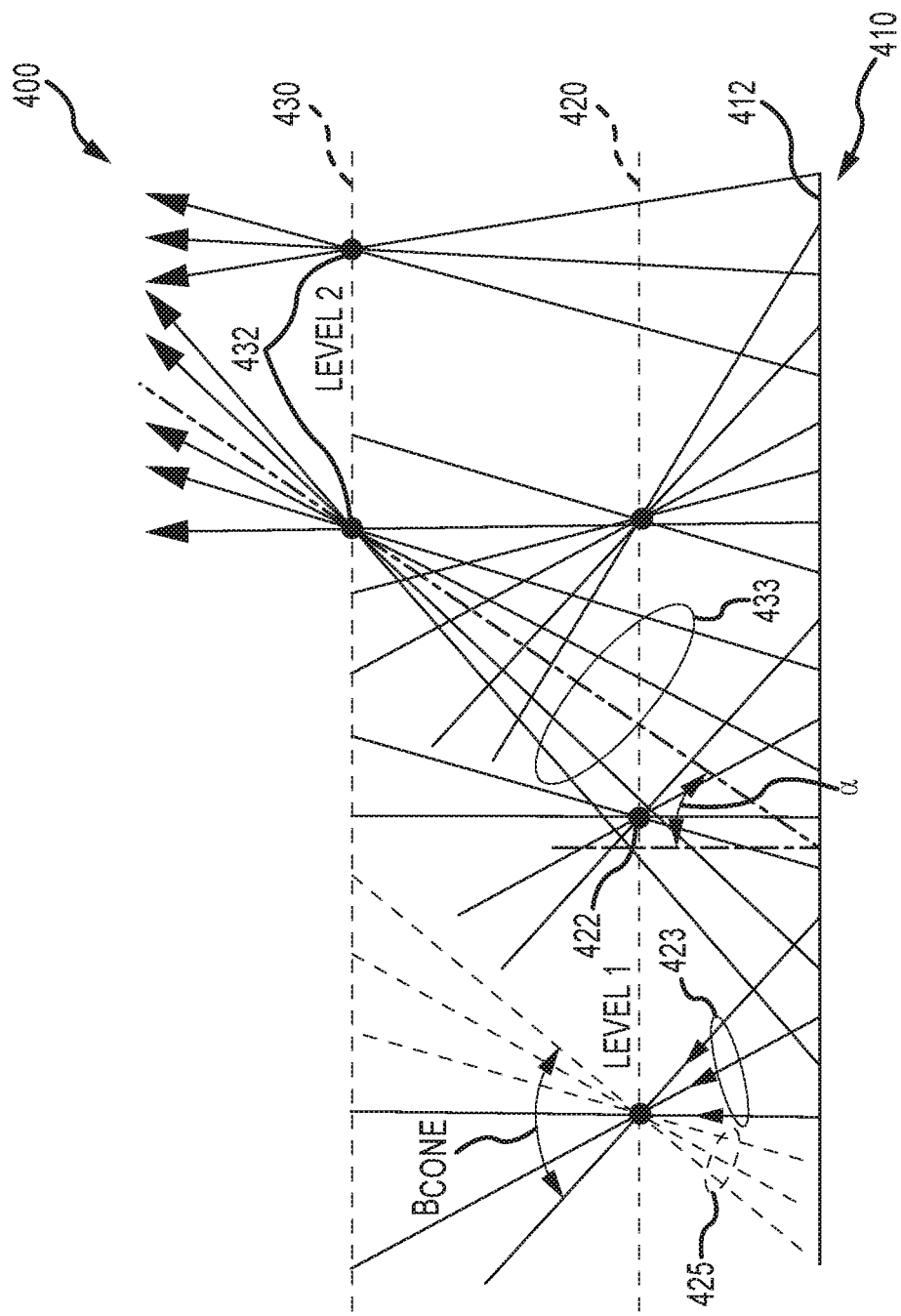
FIG. 4 is a schematic or graphic side view or diagram of a security element during its use to provide a two-layer or level image.

FIG. 4 is a schematic or graphic side view or diagram 400 of a security element 410 during its use to provide a two-layer or level image. The security element 410 includes a micro mirror array 412 made up of numerous (e.g., thousands) micro mirrors (e.g., 50 micron diameter mirrored surfaces). As shown, three sets of micro mirrors in the array 412 have been oriented or configured to display pixels 422 in a first plane or at a first level 420 above the security element 410 (or its surface containing the array 412). As shown with arrows 423, light is reflected so that beams from a set of the micro mirrors intersect to create a pixel 422 in the first level 420. These are provided within a cone angle, $\beta_{Cone}$. Further, as shown with arrows 425, a mask or mask image may defined to block some rays by having the mirrors that would provide this light directed outside of the conical angle, $\beta_{Cone}$, region (e.g., the arrows 425 are associated with light that is not actually reflected for viewing with the light 423 but is, instead, directed elsewhere).

Also, as shown two sets of micro mirrors in the array 412 have been oriented or configured to display pixels 432 in a second plane or at a second level 430 spaced apart from level 420. Arrows 433 represent beams of reflected light that are directed from these sets of mirrors to intersect or cross at the locations of the pixels 432. Also, as shown, the pixels are displayed to the viewer at viewing angles that are offset by an angle (pixel offset angle), $\gamma$ (such as 10 to 30 degrees or the like). The basic angle direction of the pixels 432 is chosen to offset the image in the plane/level 430 for the viewer (or at the viewer) from the image in the plane/level 420.

Figure 5:
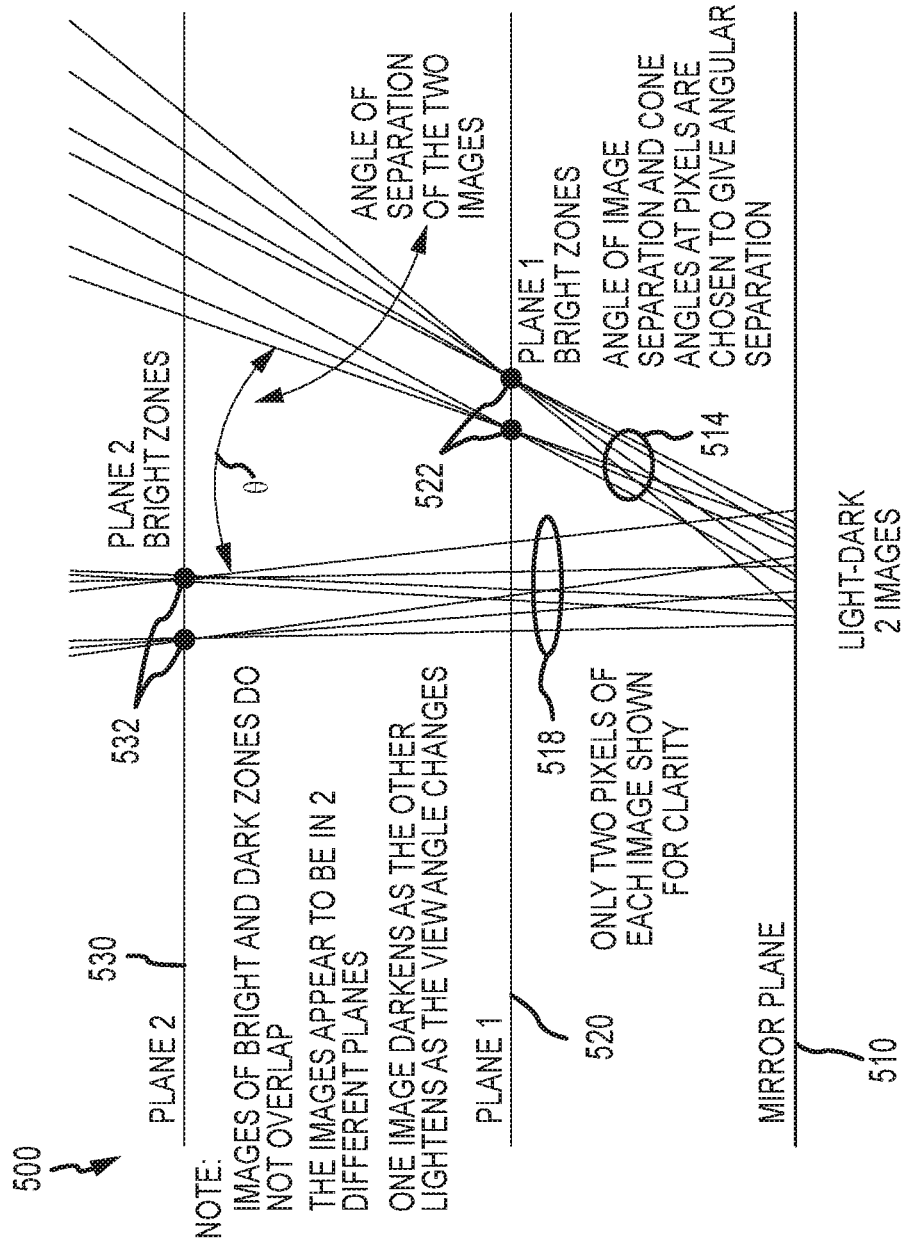
FIG. 5 is a side schematic view or diagram of a security element during its use to provide a display that combines a light image and a dark image.

FIG. 5 is a schematic or diagram 500 similar to that of FIG. 4 but showing an embodiment of a security element 510 with an array of mirrors adapted specifically to provide two light and dark images. The diagram 500 illustrates that the sets of pixel-providing micro mirrors on the security element 510 (or in a mirror planar surface) can be oriented to provide a light image (with bright pixels with a dark background) that when going in reverse provides a dark image with a light background as the viewer rotates the element 510 or otherwise changes their perspective.

As shown, the security element 510 has a planar mirror surface with an array of micro mirrors adapted to reflect light in directed beams 514 and 518. The beams/rays 514 are directed so as to display/create pixels 522 on a first plane 520 that is more proximate to the mirror plane of security element 510 (with only two pixels 522 shown in each image plane 520 and 530 (in each displayed image) for clarity with it being understood that any number of pixels (1 to more typically many (e.g., a few hundred to several thousand or the like)) may be used to create each image with the size of the mirrors and overall array provided in security element 510 being the only limitations). The beams/rays 518 provided by the other sets of pixel-providing mirrors in element 510 are directed/aimed to cross/intersect on the second image displaying plane 530 (which is spaced apart from the first plane 520 some distance such 0.25 to 1 inch to several inches or more) to display/create pixels 532.

To make the images provided by the pixels 522, 532 appear light and dark, the beams 514 and 532 are separated by an angle, $\phi$, (e.g., 15 to 30 degrees or more) as may be measured between proximate ones of the beams in each group 514 and 518 (e.g., after the beams cross proximate to the mirror plane of security element 510 such as at or after the first image display plane 520). The angle of image separation, $\phi$, and the cone angles at pixels 522, 532 are chosen to give this angular separation. Images of bright and dark zones do not overlap, and images provided by pixels 522 and 532 appear to the viewer to be in the two spaced apart or different planes 520, 530. One image darkens as the other lightens as the view angle changes.

Figure 6:
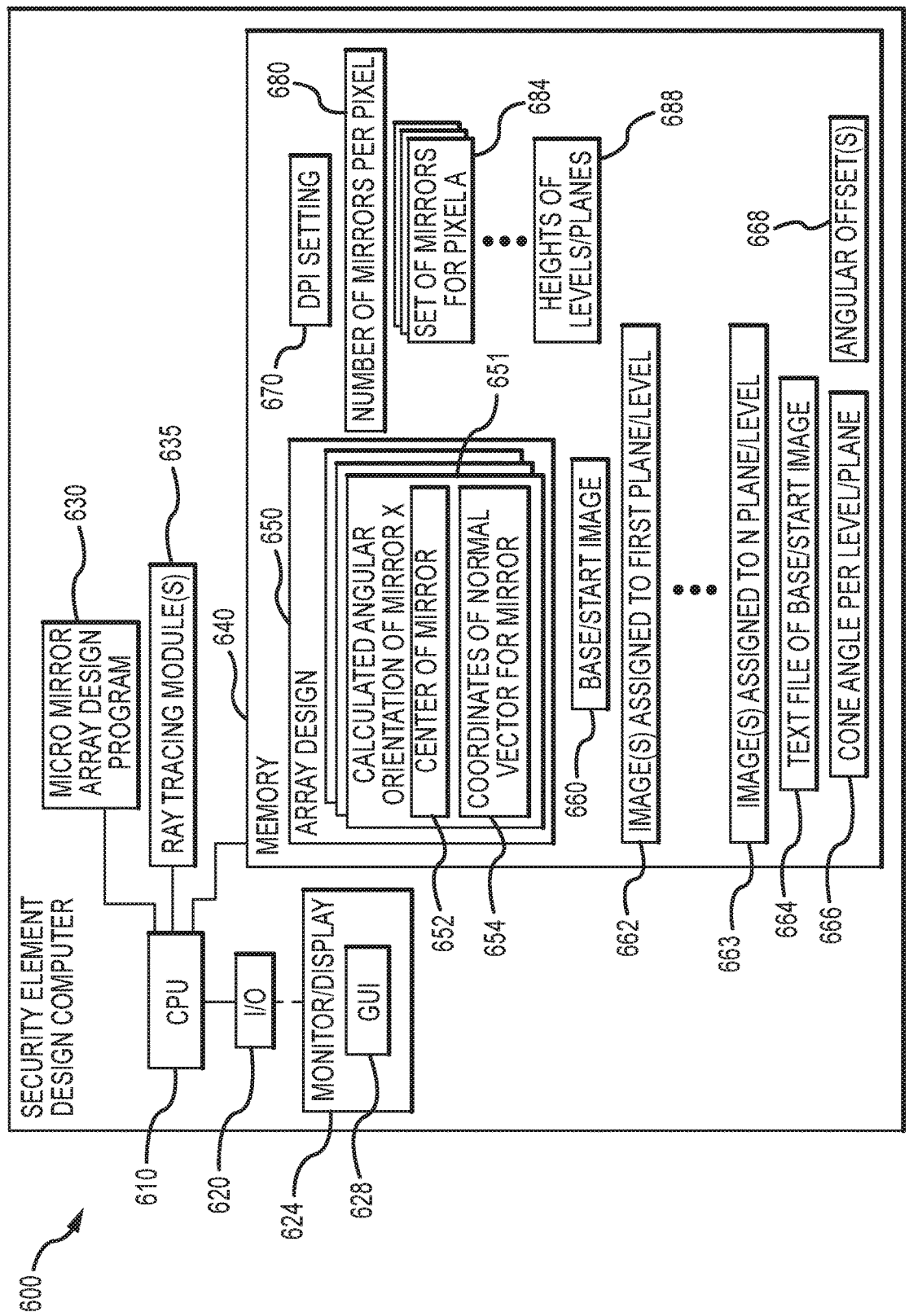
FIG. 6 is a functional block diagram of a computer or computing device configured to run an array design program to allow an operator to generate a design of an array of micro mirrors for displaying a particular image(s) when provided in a security element.

FIG. 6 is a functional block diagram of a computer or computing device 600 configured to run an array design program to allow an operator to generate a design of an array of micro mirrors for displaying a particular image(s) when provided in a security element (e.g., to perform steps of the method of manufacturing a security element with an array of micro mirrors according to the present description). The computer 600 includes a processor(s) 610 that executes code/instructions in computer readable media to run or provide the functionality of the micro mirror array design program 630 as well as those of the ray tracing module(s) 635. The processor 610 also manages operation of input/output (I/O) devices 620 such as a keyboard, a mouse, a touch pad or screen, voice recognition software, and the like configured to allow a user to provide input such as to select design parameters for a particular security element. The I/O devices 620 may include a monitor/display 624 and the design program 630 may be configured to generate one or more graphical user interfaces (GUIs) 628 displayed on the monitor/display device 624 to facilitate a user providing input and to display calculated results (such as the calculated angular orientations of each mirror in the array).

The processor 610 during the running of the design program 630 may access and manage memory (or data storage device) 640, which may be onboard as shown or offboard but accessible by the processor 610. The output of the design program 630 is stored at 650 in memory 640 and provides a design for an array of micro mirrors for a particular security element to be manufactured. The design 650 is shown at 651 to include a calculated angular orientation for each mirror in the array. This may be defined at 652 with a center location of the mirror (e.g., X-Y coordinates) combined with coordinates of a normal vector (e.g., X-Y-Z coordinates) for the mirror. This information can be used in a manufacture (e.g., deposition or other processes) of a security element for an object (such as for currency, coins, product labels, documents, and the like).

To allow the design program 630 to generate the array design 650, a user typically initially chooses a digital image 660 as a base or starting image for creating an anti-counterfeit or authentication image to be displayed in one or more planes or levels relative to the array of micro mirrors. The user/operator then may use the GUI 628 or other I/O devices 620 to identify one or more images to be displayed on each level of the image displayed by the security element being designed as shown at 662, 663. For example, images in the first plane or level 662 may be foreground images in the base/start image 660 while images 663 in the second (or later) plane or level 663 may be background (or intermediate) images of the base/start image 660. The design program 630 or another program on the computer 600 or available to the processor 610 may then be used to convert the digital base/start image 660 into a text or other file that identifies each pixel in the base/start image as being assigned to a particular one of the levels/planes (e.g., a text file with a plurality of numbers replacing the pixels of the image 660 representing one of the planes/levels of the image to be displayed by the security element being designed using the design program 630).

At this stage of operations, the design program 630 may function to generate a GUI 628 with a number of data entry boxes/fields prompting the user to accept default design parameter values or to enter/modify such values. The design program 630 may then operate to calculate the array design 650 including the angular orientations of each of the micro mirrors in an array. For example, the user may set or define a cone angle, as shown at 666 in memory 640, for use for generating the pixels of images in each level/plane used to display a security image. The cone angle often will differ for each level such as with larger values assigned to earlier/ lower levels/planes (but this is not required), and exemplary cone angles for image pixels may be in the range of 10 to 30 degrees or the like.

The user may also be asked to provide or select an angular offset between each pair of image levels/planes as shown at 668 in memory 640, and this offset may range from 0 to 30 or more degrees to achieve a desired effect for a displayed image. Other parameters that may be entered or set by the user of the system 600 may include the dots per inch (DPI) 670 that defines the spacing of the pixels in each image display level or plane (the cone apex planes). The user may also be allowed to set the number mirrors to be used to create or display each pixel as shown in memory 640 at 680 (with 20 to 40 mirrors likely to be useful in some implementations). Further, the user may define heights of the image display levels or planes as shown at 688 (such as a first plane at 10000 microns, a second plane at 20000 microns, a third plane at 30000 microns or other useful spacings/heights).

With the parameters defined, the user may instruct the design program 630 to run to first choose, for each pixel in each image to be displayed in the levels/planes, a set of micro mirrors to be used to display or create the pixel. The other pixels may be considered unused pixels or pixels that can be used in a mask, and these pixels may be angularly oriented to direct light outside of the cone angle. The design program 630 may then continue with determining an array design 650 with these sets of pixel-providing mirrors 684 by calculating for each of the micro mirrors of the array its angular orientation 651, which may be provided by the coordinates (e.g., X-Y coordinates or the like) of the center of each mirror and the coordinates (e.g., X-Y-Z coordinates or the like) of the normal vector for the mirror with such center coordinates. This determination of the design 650 is carried out such that the micro mirrors in each set of pixel-providing mirrors is oriented to direct its reflected ambient light (a reflected light stream or beam or ray) onto the same image display plane at the same location (e.g., at a location of a pixel). The ray tracing module 635 may be configured to test the effectiveness of the array design 650 as explained below to ray trace reflected light providing images to a viewer's eye (or expected viewing positions relative to a security element with the array of micro mirrors having angular orientations as called out in the array design 650).

Figure 7:
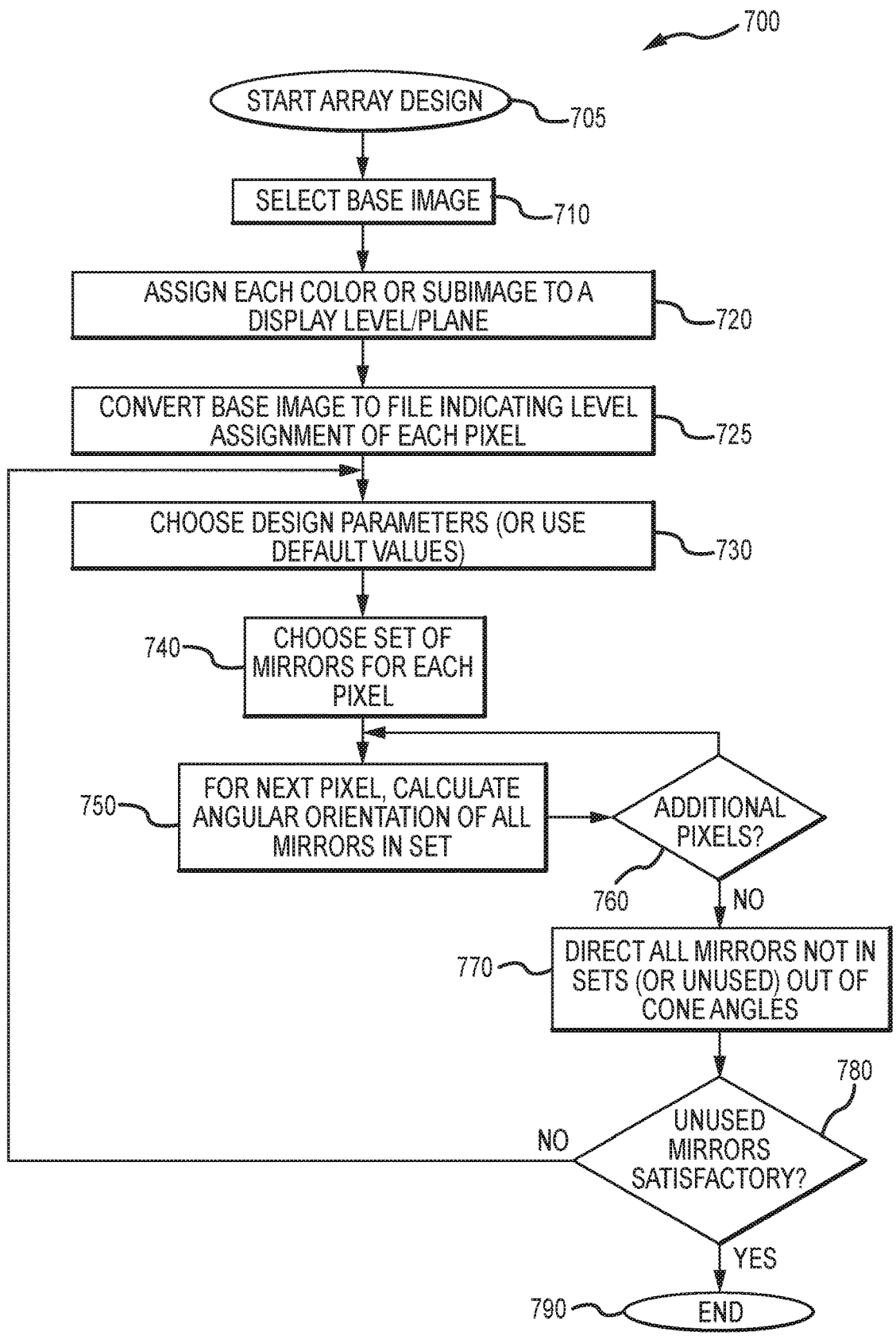
FIG. 7 is a flow diagram of an exemplary design method for an array of micro mirrors for use in a security element, such as may be carried out by operation of the system of FIG. 6.

FIG. 7 is a flow diagram of an exemplary design method 700 for an array of micro mirrors for use in a security element, such as may be carried out by operation of the system 600 of FIG. 6. The method 700 starts at 705 such as with loading a design program onto a computing device and initiating or running the program. The method 700 continues at 710 with selecting a base or start image such as selecting a file in memory of a computing device providing a digital image of objects that may be useful for providing a multi-layer display for use in authenticating an object (e.g., an image with one or more components that can be presented as foreground images and one or more components that can be presented as background and/or intermediate images or on layers that appear behind the foreground images).

In step 720, the method 700 involves a user indicating which portions/components of the base/start image from step 710 should be presented in the image(s) displayed on each of the one, two, or more image display layers for this security element. Hence, step 720 may be thought of as including first deciding how many display layers/planes to use with this array of micro mirrors (and this value can be affirmed/set in later step 730 as one of the design parameters). Step 720 may involve assigning differing colors of a colored base/start image to differing image display planes/levels. In other cases, a component/object in the image may be chosen as a foreground image and one or more of the other components/objects in the image may be selected to be background images to be on different levels/planes. At step 725, the method 700 continues with converting the base image into a file (such as a text document or file with each pixel replaced with 0's and 1's when two levels/planes are used and so on) that indicates for each pixel in the base image which level/plane that pixel is assigned for display by the array of micro mirrors.

The method 700 continues at 730 with the user choosing/setting design parameters (or accepting default ones such as may be predefined by the design program or as previously saved for other arrays). For example, the spacing of pixels in each image plane may be set (e.g., set the DPI for each image display plane/level), and the user may also set the cone angle and, in some cases, the mirror size. Step 730 may also include setting the height of each image display level/plane (which also sets the spacing between adjacent pairs of the planes/levels).

The method 700 continues at 740 with selecting or identifying a set of mirrors in the array to use to display each of the pixels in the images chosen in step 720 (with more detail provided for this process provided below). Step 740 may involve determining the number of mirrors that should be used for each pixel (typically a number between 1 and 40 or more that is used throughout the design) based on a cone angle, mirror size, and the DPI of the image (or pixel pitch). In some implementations, a program implementing the method 700 provides the average number of mirrors per pixel after step 730, and the user may determine it is useful to modify the design parameters (repeat step 730) to achieve a better result (e.g., some prototyping indicates that a "sweet spot" may exist around 25 mirrors per pixel with 10 being too few in some cases and 40 being too many in others). Step 740 may also involve defining a cone with an apex coinciding at the pixel location and with a cone angle set by the design parameters, and the cone base or area on the mirror plane may be used to define which micro mirrors may be chosen to display or "write" the particular pixel. The design parameters also define how many mirrors among the available ones in this circular or cone base area to use in the set of pixel-providing mirrors. A first mirror is chosen randomly (any useful random selection algorithm may be used and it may have "memory" in that a next run may remember which mirrors in the available set have already been chosen), and then this random process is repeated for the available mirrors until the set includes the number of mirrors needed for a complete set based on the design parameters for this array of micro mirrors.

At step 750, the method 700 includes for a next one of the pixels in the images, calculating angular orientation of all mirrors in the set of mirrors chosen for displaying that pixel. At 760, it is determined whether there remain additional pixels in the images, and, if yes, the method 700 proceeds with repeating steps 750 and 760 until all the angular orientations for the mirrors in the sets of pixel-providing micro mirrors are determined. If no at step 760, the method 700 continues at 770 with directing all mirrors not in one of these sets (or unused mirrors) so that they do not interfere with image display, e.g., by assigning an angular orientation that is outside the viewing cone for each of the pixels used to display the images on each of the levels/planes.

At step 780, the method 700 is shown to include a decision step based on the number and/or location of the unused mirrors. The method 700 (or computer program functioning to implement the method 700) may plot the position of all the unused mirrors. If there are too many unused mirrors (e.g., above a predefined maximum unused mirror number) and/or the unused mirrors are too close to each other (e.g., not scattered over the canvas or array of micro mirrors), the method 700 may return to step 730 to change the design parameters and repeat the other steps of the method 700 after step 730. The parameters that may be changed at 730 can include the cone angle (e.g., to have more surface from which to choose mirrors) and the height of the floating images (e.g., the closer the images are floating to the mirror plane the more difficult it can be to find useful mirrors so that higher or lower display/floating levels or planes will decrease the number of unused mirrors). In some cases, the DPI can be changed from the original image and/or the image design may need to be changed to obtain a useful result with method 700.

If the number and/or location of the unused mirrors is determined to be satisfactory at 770, the method 700 then may end at 790. The design of the angular array may then be output for use in fabricating a security element with an array of micro mirrors individually oriented to provide one or more images (with a number of displayed pixels) on one or more image display planes/levels.

As discussed previously, an underlying idea of the security elements of the present description is to use ambient light and a planar surface containing many small mirrors and to aim the ambient light reflected off the mirrors toward a desired point in space above the planar surface that contains the mirrors. This is called the first layer image and is defined by artwork that has light or dark pixels to be produced in a layer or level (or first image display plane). By carefully selecting the mirrors within a circle defined by the intersection of the cone defined by an apex angle and a pixel from the first layer/level as the apex of the cone, the cone apex from various mirrors in the circular base of the cone provides a point source of light floating above the level of the mirror plane at the location of a pixel, containing the mirrors. A computer algorithm (as shown with the program 630 in FIG. 6) completes this process on a pixel-by-pixel basis. If the pixel in the first layer/level is a dark pixel (e.g., a pixel not associated with the image or image component/portion from a base/start image chosen for display in the first image display plane), no rays will be aimed toward it.

In addition, the program has the capability of using a second layer of pixels that acts as a mask for the first layer of pixels so that various portions of the pixel image at level one are "hidden" or visible depending on the viewing angle. The algorithm that generates the first layer of floating pixels looks at the rays aimed to the pixel in the first layer and the continuation of the rays to the second layer. The intersection location in the second layer is calculated and is searched for nearby dark pixels of the second layer/level (mask layer and/or second image display plane). If dark pixels are found in the intersection area on the second layer, the mirror that reflected that ray to the first layer is not used to aim the ray at that pixel to the first layer (e.g., this additional processing can be used to modify or originally select the mirrors to be used to display the pixel of the first image display plane).

Thus, there is a masking effect of the mask layer as is desired. To form a mask that appears to "float" over the pixels in the first layer (or first image display plane), some pixels of the first layer will have partial cones of pixels depending on the mask geometry defined by the pixels on/off of the second layer and on the angle the pixels are viewed (as can be seen with reference to the diagram 400 of FIG. 4). As the viewer's eye is moved (or the mirror assembly tilted to the viewer), pixels of the first layer will change brightness and appear or disappear from view in a way that causes the mask to appear to move.

To insure uniform illumination across pixels, during the aiming process as described above, only one of the available mirrors is used in each pixel's cone of acceptance by the design program, and the mirror is selected at random from the available mirrors in the cone of acceptance. After the direction cosines of the selected mirror are calculated, the mirror is marked by the design program as "no longer available for use by any other pixel." The design program moves on to the next pixel, and the same sequence of events or design steps are repeated until all the pixels are used (or oriented for desired light reflection). At that point in the design algorithm, the entire sequence of pixels is again used to pick up one of the available mirrors for each pixel. After a number of cycles of the pixels, all the mirrors are used depending on the image and mask patterns. If some mirrors cannot be used because of the geometry of the image layer and mask layer, they will be aimed out of the viewing zone.

The design program allows the user to choose the values of the spacing of image levels from the mirror plane, as well as pixel cone angles, mirror sizes and pixel pitches. These all can be optimized or selected by the user to make (or try to make) the best image to present to the viewer. The inputs to the design program in some embodiments are pixel image files for the first layer image and for the mask for the second image display plane or layer/level. However, there are also capabilities for the program to make its own test input layers. The output of the program is a data file containing mirror locations and the coordinates of the normal vector to each mirror in a format suitable to make the mirrors or to form an array of micro mirrors on a supporting substrate (such as a piece of currency, a coin, a product label, a document, or the like).

Figure 8A:
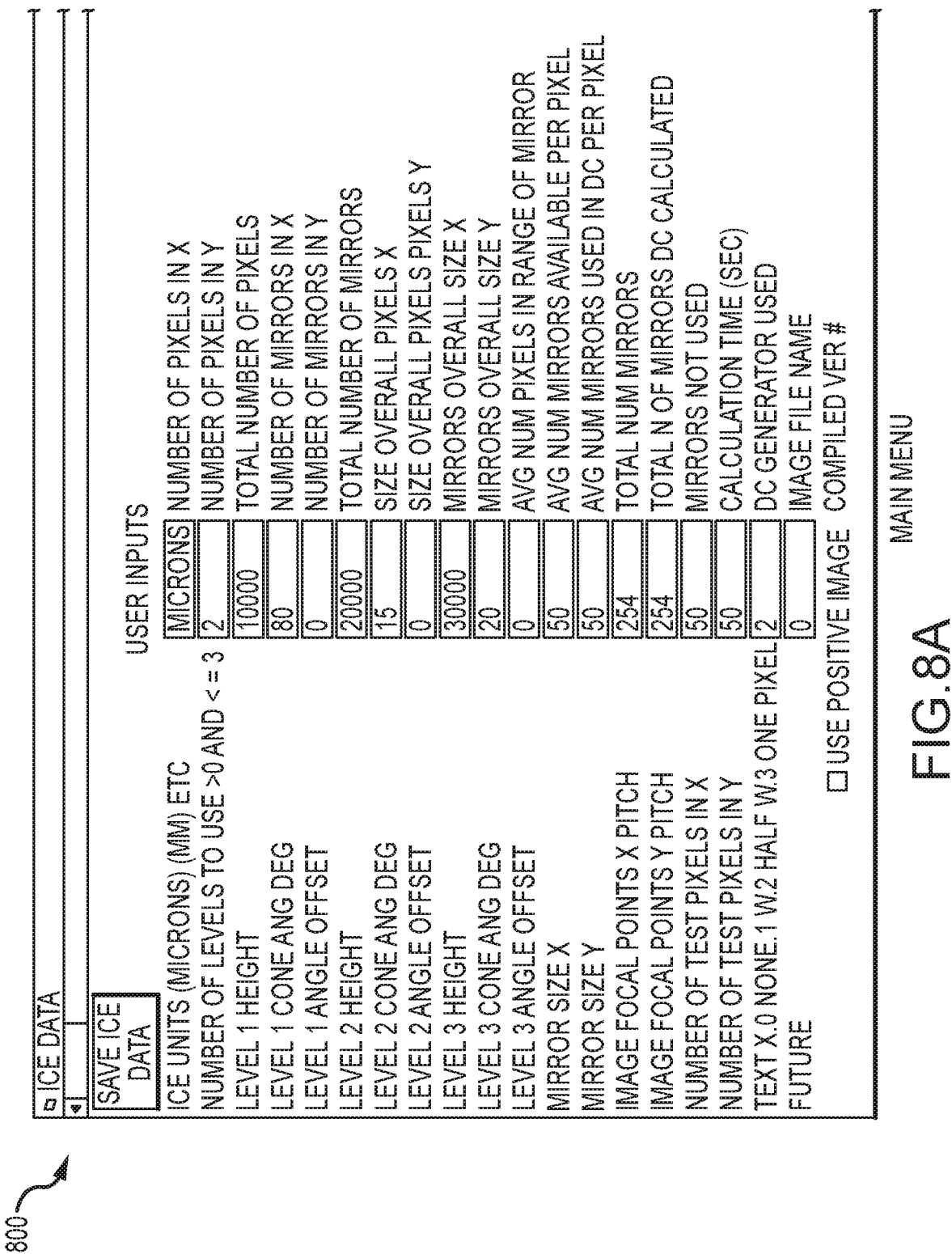

In some embodiments, the design program allows the user to see the input files, ray traces to different levels (e.g., via operation of the ray tracking module 635 shown in FIG. 6), and the expected image seen on the retina of a viewer. Tracings can be done using input cones of light on the mirrors to see the affects ambient light distributions on the viewer's retina. As an example of the GUI 628 of FIG. 6 that can be generated by the design program 639, FIG. 8 illustrates a micro mirror design GUI 800 that is displayed in one prototype of the design program created and used in prototyping by the inventors.

The main GUI or menu 800 shows an exemplary set of inputs (design parameters, for example) that can be chosen, input, or modified by the user. These include pixel pitch, level/image display plane values, and cone angles for pixels, mirror size, and selection of test patterns. The right side of the GUI/menu 800 shows some of the details or results of the calculations performed by the design algorithm based on the user's input or selected (or default) design parameters provided on the left side. These include the number of mirrors that are dark (aimed away from pixels of images chosen for display on level or image display plane), numbers of mirrors used, algorithm used, and time required to calculate direction cosines of mirrors.

The level height parameter can be used to define or set how far above or below the mirror plane, in microns, that the image designated will appear for a mirror array design. The level cone angle degree parameter sets the angle at the floating pixel of the cone in which specific mirrors can be selected. A narrower angle means that there will be fewer potential mirrors for each pixel, and the opposite for a larger angle. The level angle offset parameter defines or sets the angle of offset that you would like the image level to appear, in respect to the Z axis. The "Assign Image (1,2) color (0,1,3,4) to level#" input box allows the user to place the various image colors to the specified levels. The "Border Edge Width Add" input box allows the user to expand or shrink the canvas to allow for movement of the images.

As noted earlier, the design process begins with inputting or providing an image file for the design program to process to create or calculate the design for the micro mirrors. One significant parameter in such design calculations is the resolution (DPI), and, in some applications, it may be useful to input or use lower resolution files (or digital images). For instance, an image that is 100 DPI is equivalent to having a pixel every 254 microns, and in the GUI 800 in FIG. 8 this is the input shown under "image focal points X pitch=254" (and the same value for Y pitch). Based on this resolution or how many pixels you need floating to represent that specific image along with the mirror size (in the attached menu 800 this is 50 microns), the design program calculates "avg Num Mirrors available per pixel," which in this example is 25.7685291. In other words, a little over 25 mirrors that can be used to represent one pixel from the original or base/starting image file.

Figure 9A:
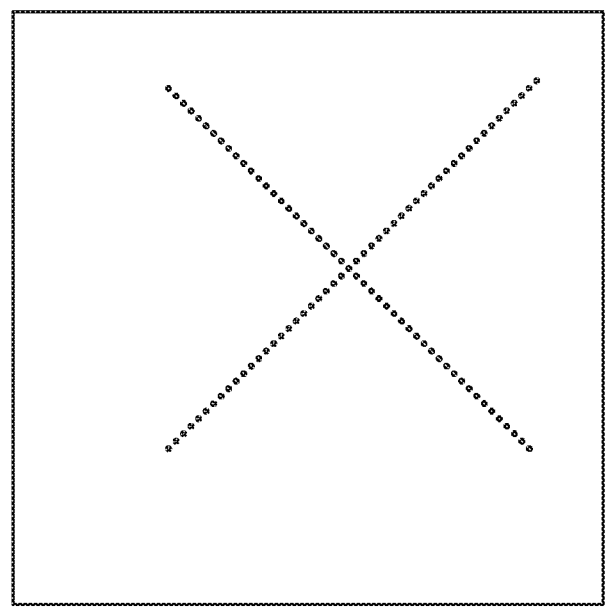
FIGS. 9A-9C are graphs illustrating images that can be displayed on various levels or image display planes by an array of micro mirrors of the present description.
Figure 9B:
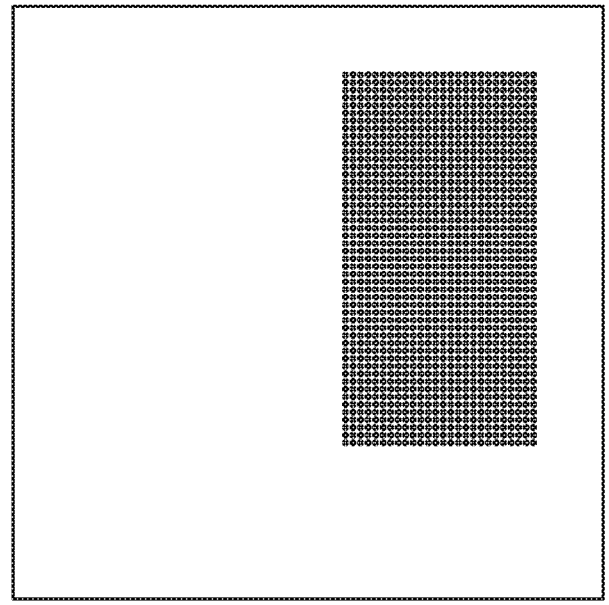
Figure 9C:
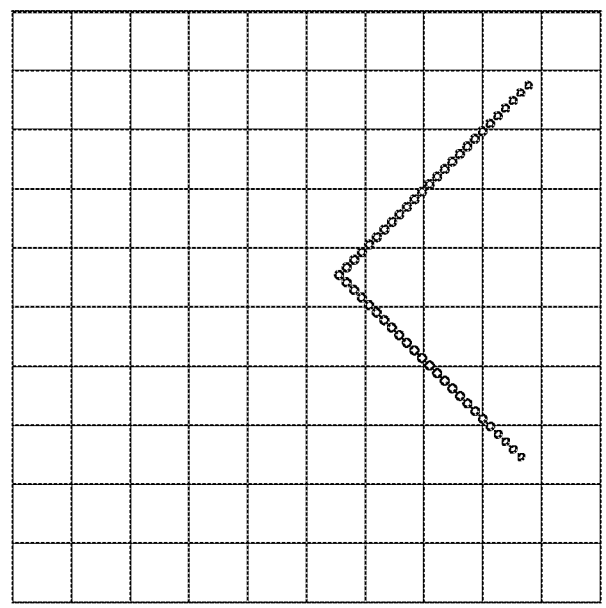

FIGS. 9A-9C illustrate with graphs 910, 920, 930 images that can be displayed on various levels or image display planes by an array of micro mirrors of the present description. Graph 910 of FIG. 9A shows a first layer image, with the light or on pixels providing an "X" pattern that would be displayed by a number of sets of pixel-providing mirrors to be floating in a first image display plane. In FIG. 9B, graph 920 shows a second layer image, with the light or on pixels providing a rectangular background pattern or object that would be displayed by a number of sets of pixel-providing mirrors so as to be floating in a second image display plane. The graph 930 of FIG. 9C shows a partial "X" of light or on pixels displayed with micro mirrors of an array and shows the effect of a mask blocking part of the image.

Figure 10:
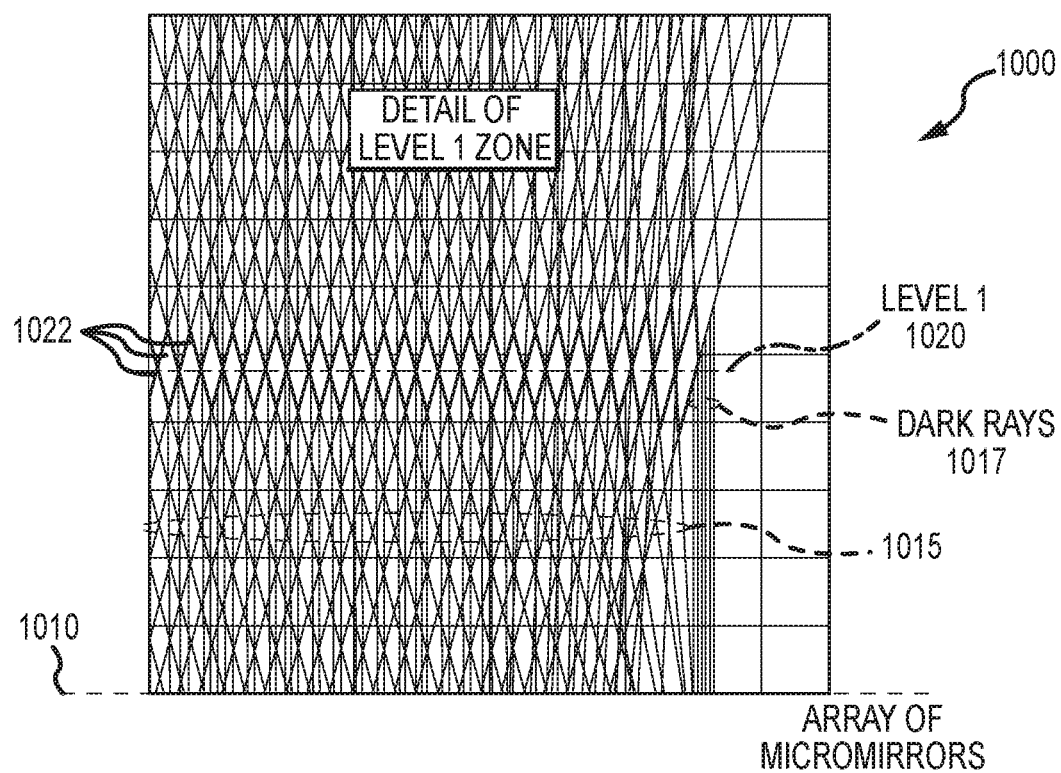
FIG. 10 is a plot illustrating a ray tracing near a first image display plane or first level/layer for one modeled array of micro mirrors.

FIG. 10 is a plot 1000 illustrating a ray tracing of light rays 1015 and dark rays 1017 near a first image display plane or first level/layer 1020 for one modeled array of micro mirrors 1010. As can be seen, the array of micro mirrors 1010 provides converging rays of reflected ambient light meeting or intersecting at a number of pixels 1022 at the floating pixel level or image display plane 1020 (or a first level as discussed above). It can also be seen that dark rays 1017 are directed away from the converging points/pixels 1022 and do not converge at the first level 1020.

Figure 12:
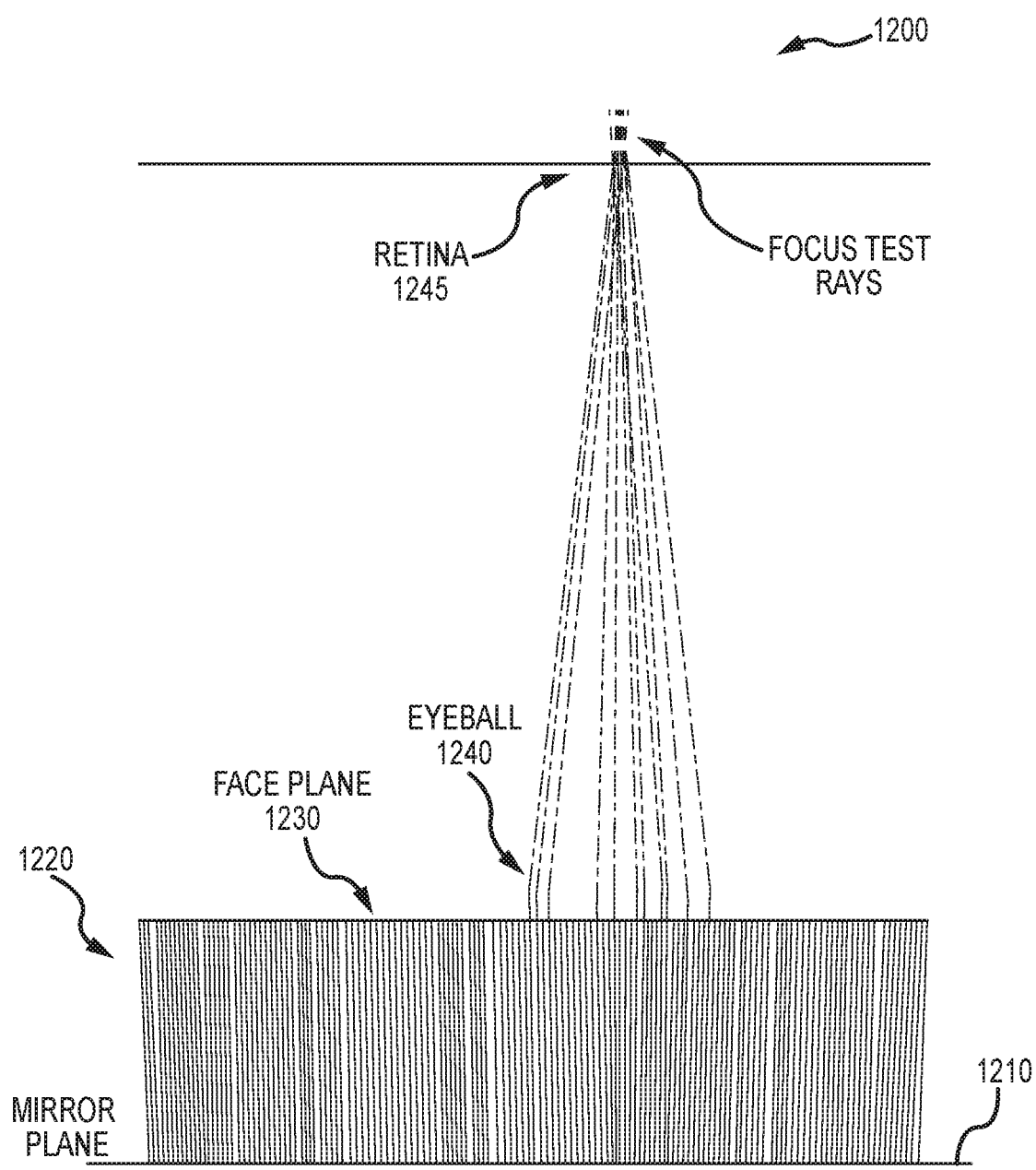
FIG. 12 is a plot of a representative ray tracing showing beams/rays reflected from micro mirrors in a mirror plane and converging on a viewer's retina.

One useful analysis tool of the design program and/or the ray tracing module is that a designer of an array of micro mirrors for a security element is able to evaluate the image as seen by a viewer. To this end, a ray tracing part of the design module (or a separate module as shown in FIG. 6) is used to view the image on a simulated retina. Thus, the effectiveness of array design including a mask can be analyzed by putting the viewer's eye in various locations, which is equivalent to tilting the mirror plane, and plotting the ray traced image on the simulated retina. FIG. 11 illustrates a representative GUI or ray tracing menu 1100 that allows a user to specify parameters to utilize in performing the ray tracing. FIG. 12 illustrates a plot 1200 of a representative ray tracing showing the mirror plane 1210, traced reflected rays/beams 1220, a face plane 1230, location of a viewer's eyeball at 1240, and a corresponding retina at 1245 upon which rays converge indicating display of a set or number of pixels of a "written" or displayed image by the mirrors oriented in a desired manner at the plane 1210.

A number of manufacturing approaches may be used to fabricate an array of micro mirrors for attachment to or upon a surface of a substrate (such as currency, coins, product labels, and so on). In some embodiments, a photo resist process has been implemented by the inventors in creating security elements or devices as taught herein. As discussed earlier, the design program or software generates an output file (as explained in more detail below). To form the micro mirrors according to this output file, a laser system is used to expose the photo resist material, usually on a quartz or lime glass master. The photo resist material is normally at least 25 microns thick. The laser or laser system may expose the material in steps such as in about 0.5μ steps. The exposure settings correspond to the amount of material that will be washed away and not hardened, and this exposure creates a "Z" axis or height of the feature. The resulting micro mirrors (which may be flat or may be concaved for better focus depending upon design) are made in the photo resist material. The photo resist is generally still light sensitive and will "melt" in white light. In some cases, the photo resist is chrome plated in house before processing. The photo resist is then placed in an electroforming tank. The resist is charged and attracts nickel (or other metallic) particles, and nickel is "grown" on the photo resist as a nickel "shim." This nickel shim can be "turned" as needed from negative to positive and back again for tooling. The nickel shim is then used in the cast and cure process to form the array of micro mirrors oriented as indicated by the output file of the design program or software.

In other fabrication processes, a UV (ultraviolet light) or energy-cured polymer is used, and the process includes metallizing the mirrors to form an array as taught herein. In other cases, the fabrication process involves stamping or forming the micro mirrors into surfaces such as chrome or aluminum containers.

In general, the inventors teach a method of fabricating a security or branding element. The method includes providing a substrate and forming an array of micro mirrors on a surface of the substrate. The array of micro mirrors is configured for receiving ambient light and, in response, displaying an image in a plane spaced a distance apart from the surface of the substrate. The image comprises a plurality of pixels, and the array of micro mirrors includes for each of the pixels a set of the micro mirrors each having a reflective surface oriented to reflect the ambient light toward a point on the plane corresponding to one of the pixels.

In some embodiments of the fabrication method, the forming the array of micro mirrors step includes casting the micro mirrors with a mirror tool in contact with the surface of the substrate. In these embodiments, the substrate may be a clear, energy-cured polymer, and the mirror tool can be formed of nickel or a polymer.

In some cases, the step of forming the array of micro mirrors includes metallization of surfaces of the micro mirrors. This may be performed so as to apply a thin layer of aluminum, gold, or silver to form reflective surfaces or form the mirror structures of the array. The metallization may be performed in a vacuum chamber using a deposition system or the like. Further, the forming step may include, prior to the metallization of the surfaces of the micro mirrors, embossing the surface of the substrate to form the surfaces of the micro mirrors. In this regard, it may be useful for the surface of the substrate to include or be made up of an embossable coating or layer.

In performing the fabrication method, the substrate may be (or include or be provided on) a coin, an automobile part, a computer part, a bumper, or a container, and the displayed image provides branding or authentication for the component that includes the array of micro mirrors. In such cases, the array forming step may include stamping the micro mirrors into the surface of the substrate.

In the same or other embodiments, the step of forming the array of micro mirrors may involve filling in recessed surfaces associated with the micro mirrors with a filler so as to make duplication (e.g., by molding) more difficult if not impossible. The filler may take the form of an ultraviolet (UV) varnish, an e-beam solvent, a water-based varnish, or the like. In some cases, it may be desirable for the filler to have a higher refractive index such as an index of at least 1.55, such that at least a portion of the received ambient light at extreme angles is reflected to sharpen the displayed image for a viewer.

From the description and figures, it can be seen that there are numerous advantages and unique features of security elements/devices that include or are formed of arrays of micro mirrors. The individual mirrors can be programmed or oriented in two axes to focus to a specific pixel in any visual plane (e.g., in a first image display plane, in a second image display plane, and so on). In this way, the micro mirrors are used to image pixels forming drawings or text that appear to float relative to the planar surface containing the array of micro mirrors. The micro mirrors can be configured or designed to focus above or below the visual plane forming pixels that in combination display images with depth (multi-layered or multi-depth imagery). The program performs a unique design method providing an output file that can be used in fabricating or generating the micro mirrors.

In practice, the shape of the micro mirrors can be round, square, and rectangular with the reflective surface being flat, concave, or convex to provide desired focusing upon a pixel (or location on one of the image display planes). The size of the mirrors may vary to practice the arrays of micro mirrors such as from about 1000 microns down to one micron with mirrors in the 35 to 70 micron range likely being desirable (with 50 micron square mirrors being used in a prototype/model).

An array of micro mirrors can be designed to provide a variety of visual effects such as showing images above or below the visual planes and in first, second, third, or more image display planes relative to the mirror-containing planar surface. In other cases, the mirrors are used to provide an effect of light images with dark backgrounds animating to light backgrounds and dark images with a change of perspective. In the same or other cases, an array of micro mirrors can be configured with selective orienting of mirror reflective surfaces to provide a masking effect showing one image receding as it goes across another image. In many cases, the micro mirrors generate more than one level of imagery to the viewer (two or more). Particularly, the micro mirrors can generate one image made up of a set of pixels at one level above the focal plane while also (or separately) generating an image below the focal plane. In the same or other cases, the micro mirrors may be configured to generate an image at the focal plane. In these embodiments, the images are displayed/written either with bright pixels (light) or dark pixels (the absence of light or reflected light from the viewer). Images created by the micro mirrors can provide an animation effect, and, in the same or other embodiments, the images created by the micro mirrors may provide a 3D effect.

The array of micro mirrors can be used in (or provided as part of) a currency thread, which may be about 10 to 50 microns thick. The array of micro mirrors or security element can be used as a foil stamp that may be about 10 to 100 microns thick. The array may be formed by stamping the micro mirrors into any metallic surface, such as a surface of a coin, or by placing the micro mirrors on glass, ceramic, or plastic substrates, which may be clear so as to create a unique visual display or imaging effect that allows a viewer to see images in display planes on two sides of the substrate supporting the array of micro mirrors (or transparent film including such mirrors). In these and other ways, an array of micro mirrors may be successfully used in any high security application including, but not limited to, passports and other high security documents including currency.

In some embodiments, the displayed or written image is colored (e.g., is not simply black and white). In one embodiment, a color display is created by forming the mirrors of the array with plasmonic resonance for color while other fabrication processes use tinting of the reflective mirrors with ink. In other embodiments, diffractive material is added to the reflective surface of the mirrors or diffraction grating may be used to create color with the micro mirrors. In some embodiments, dielectrics are used to provide color with the array of micro mirrors. In still other colored display embodiments, a protective cover layer may be applied to the mirrors that is transparent (to-translucent), and then coloring may be provided by printing on this cover layer with translucent color squares (or other mirror shape-matching coloring filters) aligned over the proper micro mirrors to achieve a desired colored image in one or more of the image display planes or levels/layers.

Figure 13A:
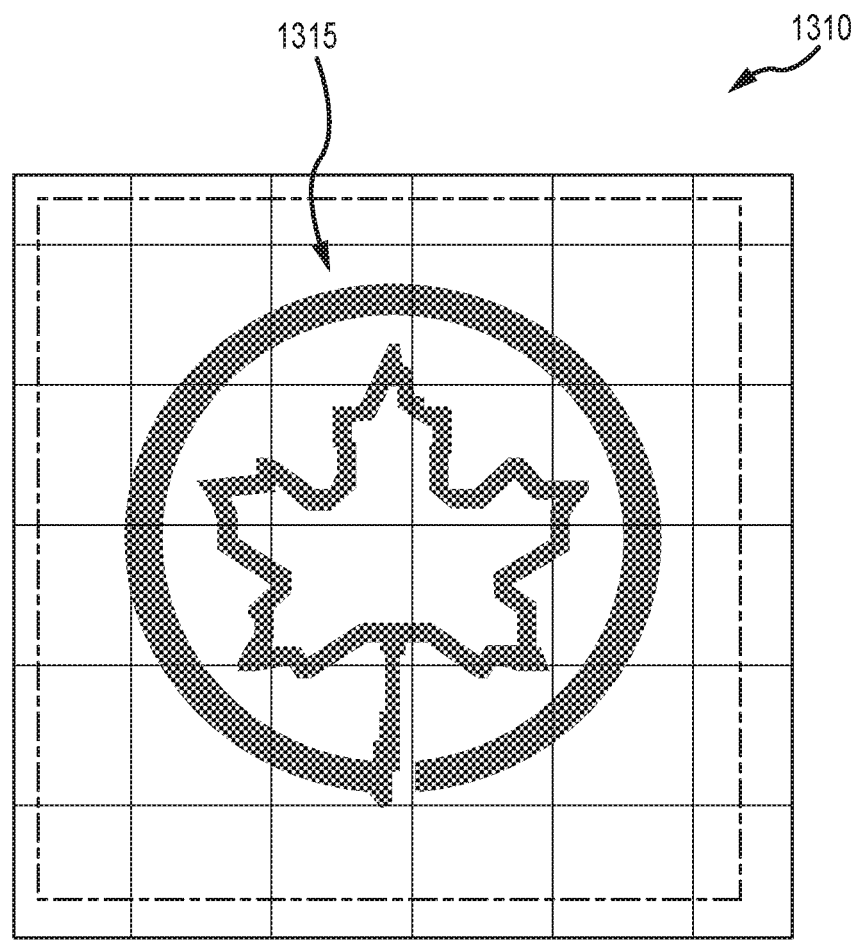
FIGS. 13A and 13B illustrate written or displayed images provided by an array of micro mirrors with an angular offset between image display planes or levels/layers of the imagery.
Figure 13B:
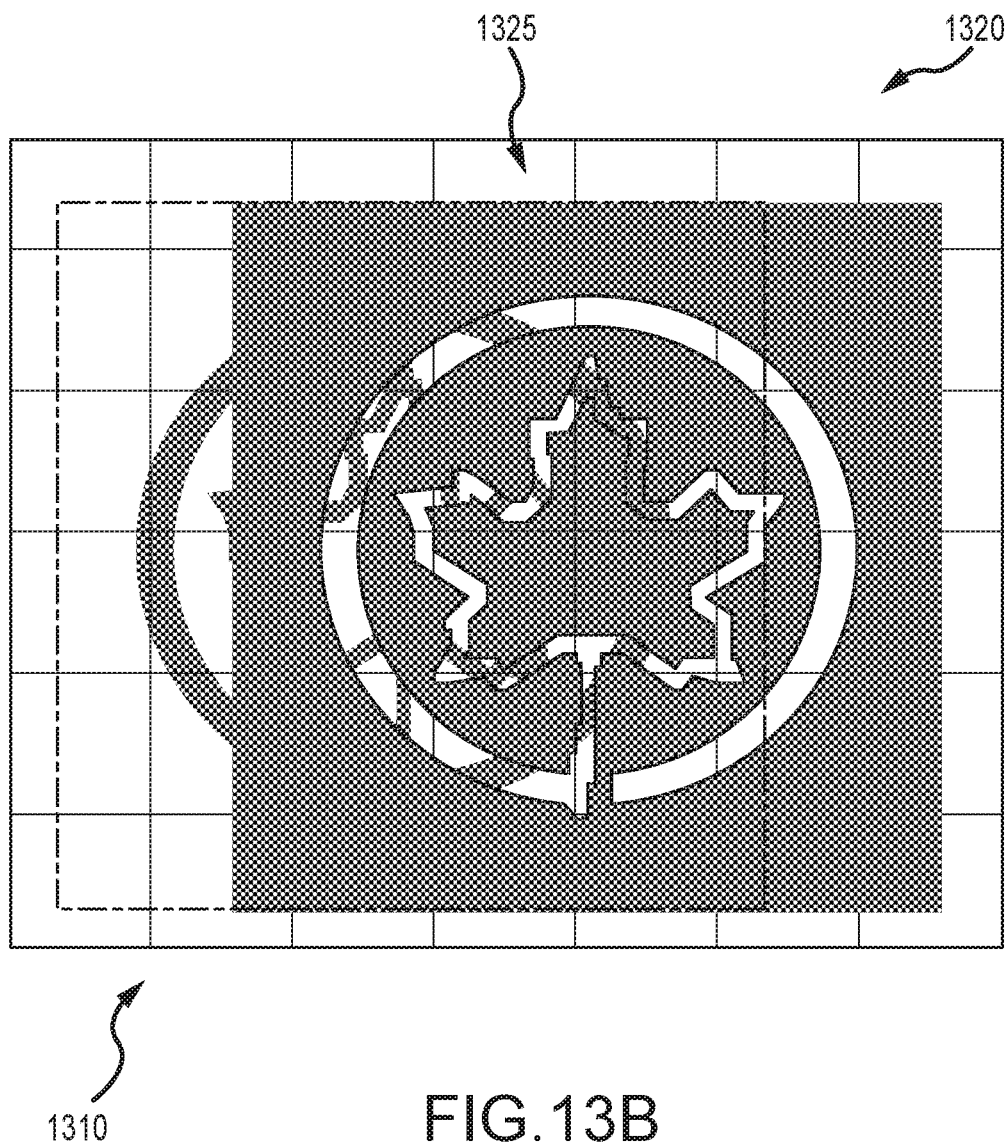

FIGS. 13A and 13B illustrate plots 1310 and 1320 provided by the design program of images chosen for display on first and second image display planes or levels, respectively, and these are the two images that would be written or displayed by micro mirrors of an array. In FIG. 13A, a user has input an image with a colored or plain background with a circular boarder enclosing a leaf, and the circular boarder and the outline of the leaf have been chosen for display or writing on a first level or first image display plane (at a first height such as 10000 microns away from the planar surface containing the mirrors). The offset angle may be set at 0 degrees (or some other value), and FIG. 13A represents an approximation of what a viewer would see when viewing the security element with this design of an array of micro mirrors. Particularly, a plurality of bright or "on" pixels showing the circular boundary and the outer edges/boundary of the leaf.

FIG. 13B shows the first layer imagery 1310, but it also shows with plot 1320 that as the viewer rotates the mirror plane or changes their perspective (e.g., from a 0 degree viewing angle to the offset angle that may be 20 degrees or the like) the original images 1315 are replaced with the new images 1325 at the second level or second image display plane (which may be at 20000 microns or some other height such that the two levels/image display planes are spaced apart some desired distance). As shown, the designer/program user has indicated that the background of the input image, the inner portion of the circle, and the inner portion of the leaf should be written or have their associated pixels "on" in the second layer while the portions chosen for image 1315 of the first layer are "off" or dark. In this manner, the image sees a transition between displaying imagery with light and then with dark pixels as their perspective or viewing angel changes to view the images in the two spaced apart levels/layers or image display planes.

Figure 14A:
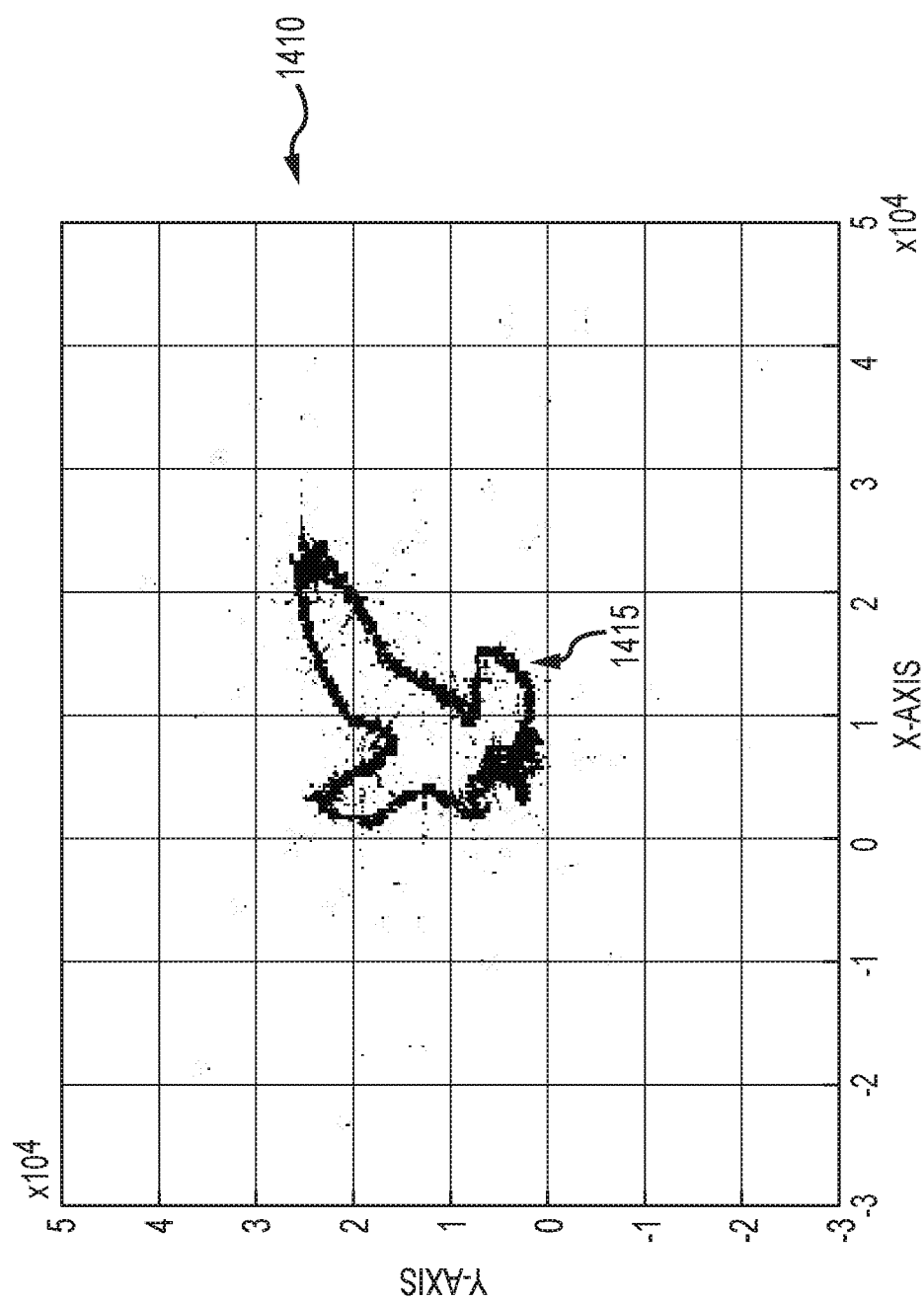
FIGS. 14A and 14B illustrate plots of floating pixels in a space above an array of micro mirrors.
Figure 14B:
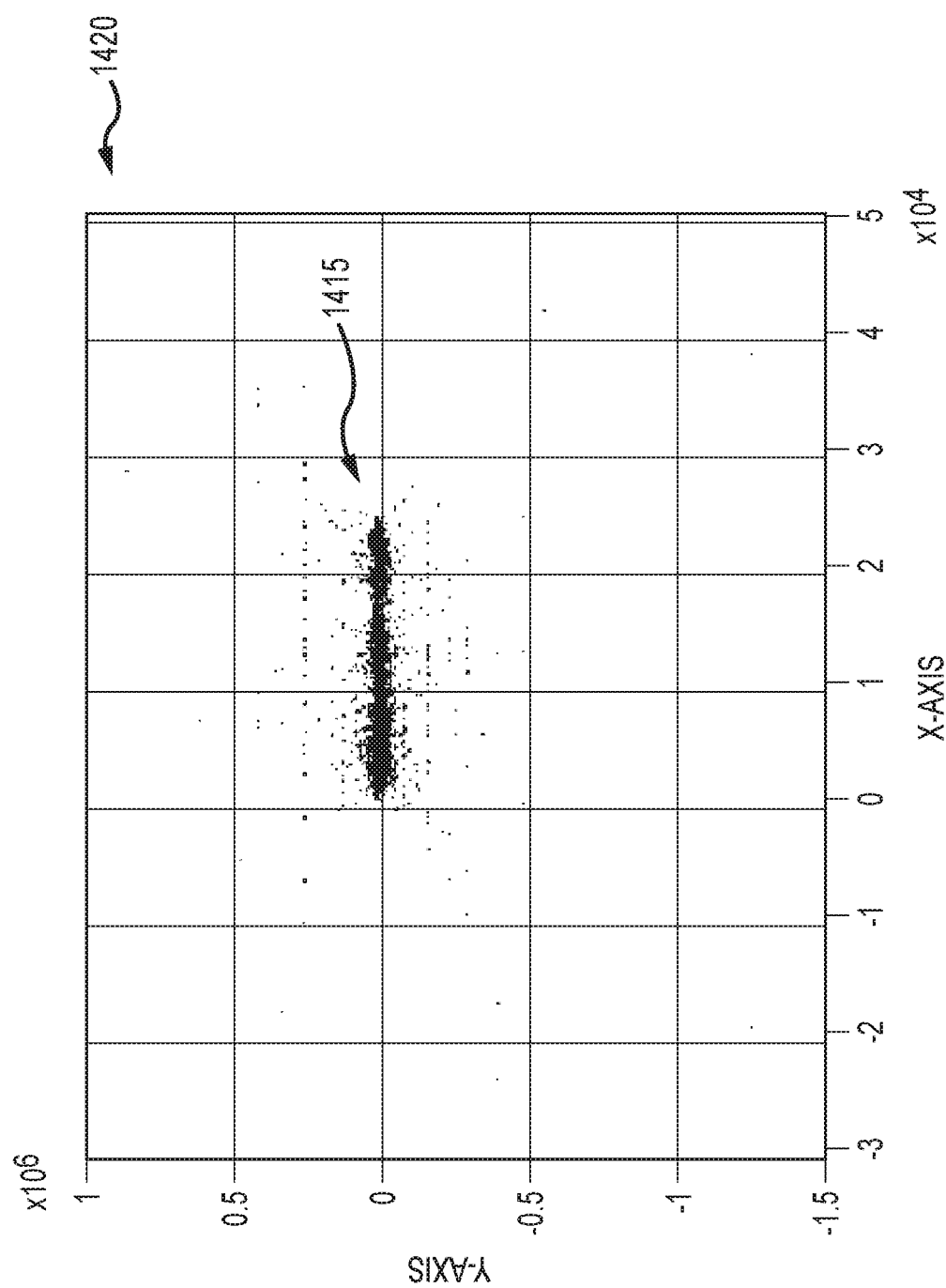

FIGS. 14A and 14B illustrate plots 1410 and 1420 that show the results of programming or orienting an array of micro mirrors to display an object or image 1415 (here an eagle or hawk). The plot 1410 of FIG. 14A may be considered a top view as the intersections of normal vectors from the micro mirrors are shown relative to X and Y axes while the plot 1420 of FIG. 14B may be considered a side view as the same intersections are shown relative to the X and Z axes. FIG. 14A is useful for showing a representation of what a viewer would perceive when looking in an orthogonal direction to the plane containing the mirrors, e.g., the viewer perceives the outline of an eagle (which may be displayed or written with bright or dark pixels). The intersections act to display "pixels" that, as can be seen at 1415, work in combination to display an object/subimage (as may be chosen by a user of the design program from an input image file for display in a particular level or image display plane). FIG. 14B shows that the pixels (or normal vector intersections) are generally planar or provided in a plane coinciding with a preset/defined level or image display plane relative to the planar surface containing the micro mirrors (e.g., a plane spaced apart a predefine distance from the array of micro mirrors), and this acts to provide a floating image 1415 or an image with depth or 3D effects.

As discussed above, the design program or algorithm functions to create an output file that may be used in manufacturing an array of micro mirrors adapted to display one or more floating images above (or below) the planar surface containing the array. Table 1 below provides exemplary data that may be provided in such an output file (with only a small number of mirrors being shown for ease of explanation but with it understood that similar data would be provided for each mirror in the array). The X and Y columns of Table 1 show mirror positions (in microns), e.g., in the second row a mirror is located in the array at 35 microns on the X axis and at 0 microns on the Y axis. In the table, next to each mirror location in the array, the DX, DY, and DZ columns provide the coordinates of the normal vectors for each of the mirrors. In this way, each mirror has a defined position in the array and a precise direction its reflective surface is pointing in space.

In creating the exemplary data in Table 1, the following assumptions were made for the design of the array of micro mirrors: (1) units are microns; (2) the array is configured to have flat mirrors with tilted reflective surfaces; (3) the mirrors were square in shape with 35 micron sides; (4) the array was also assumed to be square in shape with 27,930 micron sides; (5) the number of mirrors was calculated to be 798 along the X and Y axes such that the total number of mirrors was 636,804; and (6) the maximum mirror tilt angle was requested to be 30 degrees (e.g., due to vendor/manufacturer limitations so may be set at 20 degrees).

TABLE 1

| X | Y | DX | DY | DZ |
| --- | --- | --- | --- | --- |
| 0.00 | 0.00 | −0.061672 | 0.021122 | 0.997873 |
| 35.00 | 0.00 | −0.020315 | 0.050724 | 0.998506 |
| 70.00 | 0.00 | −0.063424 | 0.008449 | 0.997951 |
| 105.00 | 0.00 | −0.064293 | 0.008449 | 0.997895 |
| 140.00 | 0.00 | −0.056737 | 0.016904 | 0.998246 |
| 175.00 | 0.00 | −0.053402 | 0.000000 | 0.998573 |
| 210.00 | 0.00 | −0.058482 | 0.012677 | 0.998208 |
| 245.00 | 0.00 | −0.025586 | 0.008464 | 0.999637 |
| 280.00 | 0.00 | −0.051801 | 0.000000 | 0.998657 |
| 315.00 | 0.00 | −0.061093 | 0.012675 | 0.998052 |
| 350.00 | 0.00 | −0.061967 | 0.004225 | 0.998069 |
| 385.00 | 0.00 | −0.058619 | 0.016902 | 0.998137 |
| 420.00 | 0.00 | −0.046852 | 0.000000 | 0.998902 |
| 455.00 | 0.00 | −0.018142 | 0.004233 | 0.999826 |
| 490.00 | 0.00 | −0.061225 | 0.021122 | 0.997900 |
| 525.00 | 0.00 | −0.062100 | 0.016898 | 0.997927 |
| 560.00 | 0.00 | −0.062979 | 0.000000 | 0.998015 |

TABLE 1-continued

| X | Y | DX | DY | DZ |
| --- | --- | --- | --- | --- |
| 595.00 | 0.00 | −0.063848 | 0.004225 | 0.997951 |

Figure 15A:
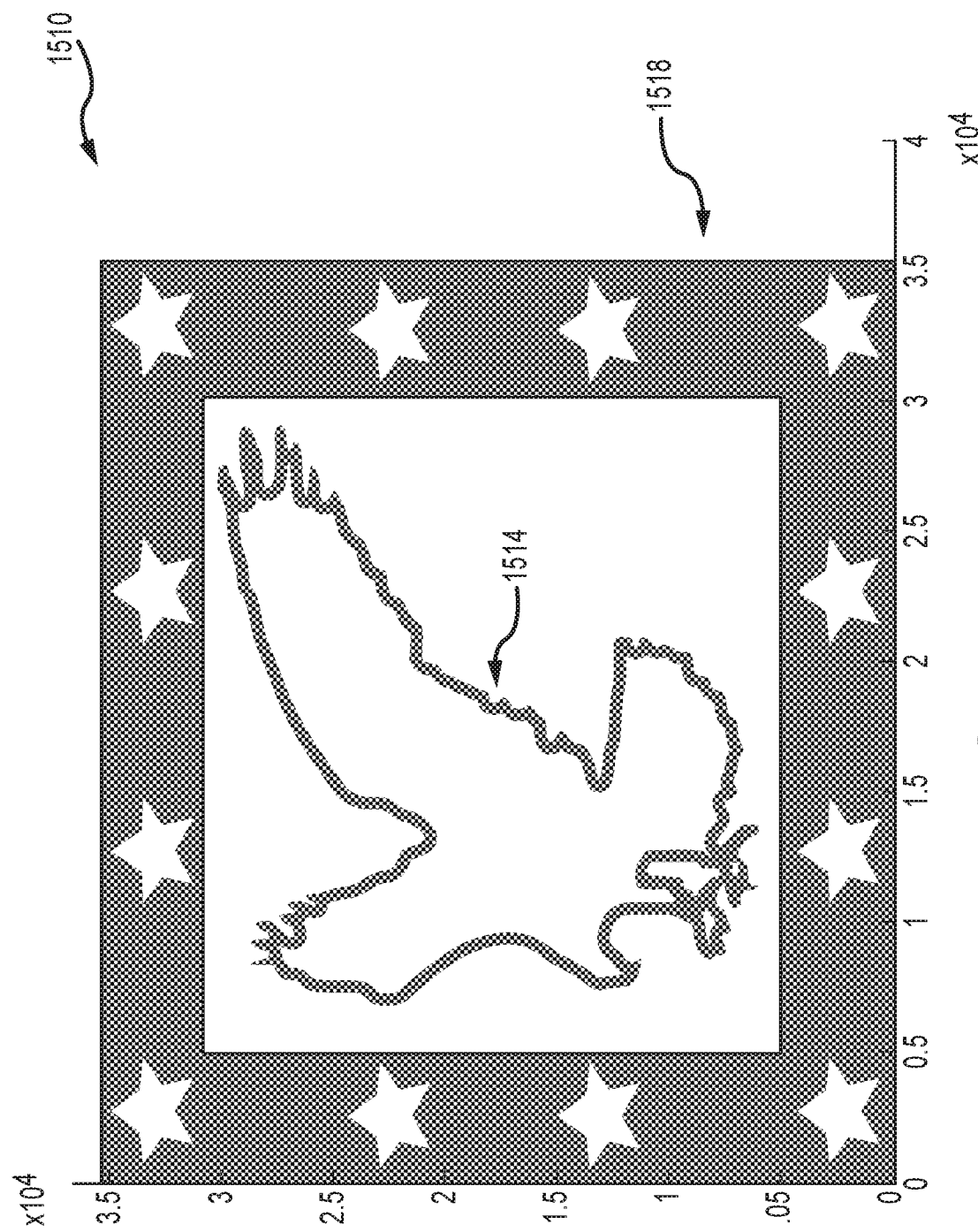
FIGS. 15A and 15B illustrate plots generated and displayed by a preview program (which may be a subroutine of the design program described herein) for previewing likely or predicted results of a design of an array of micro mirrors.
Figure 15B:
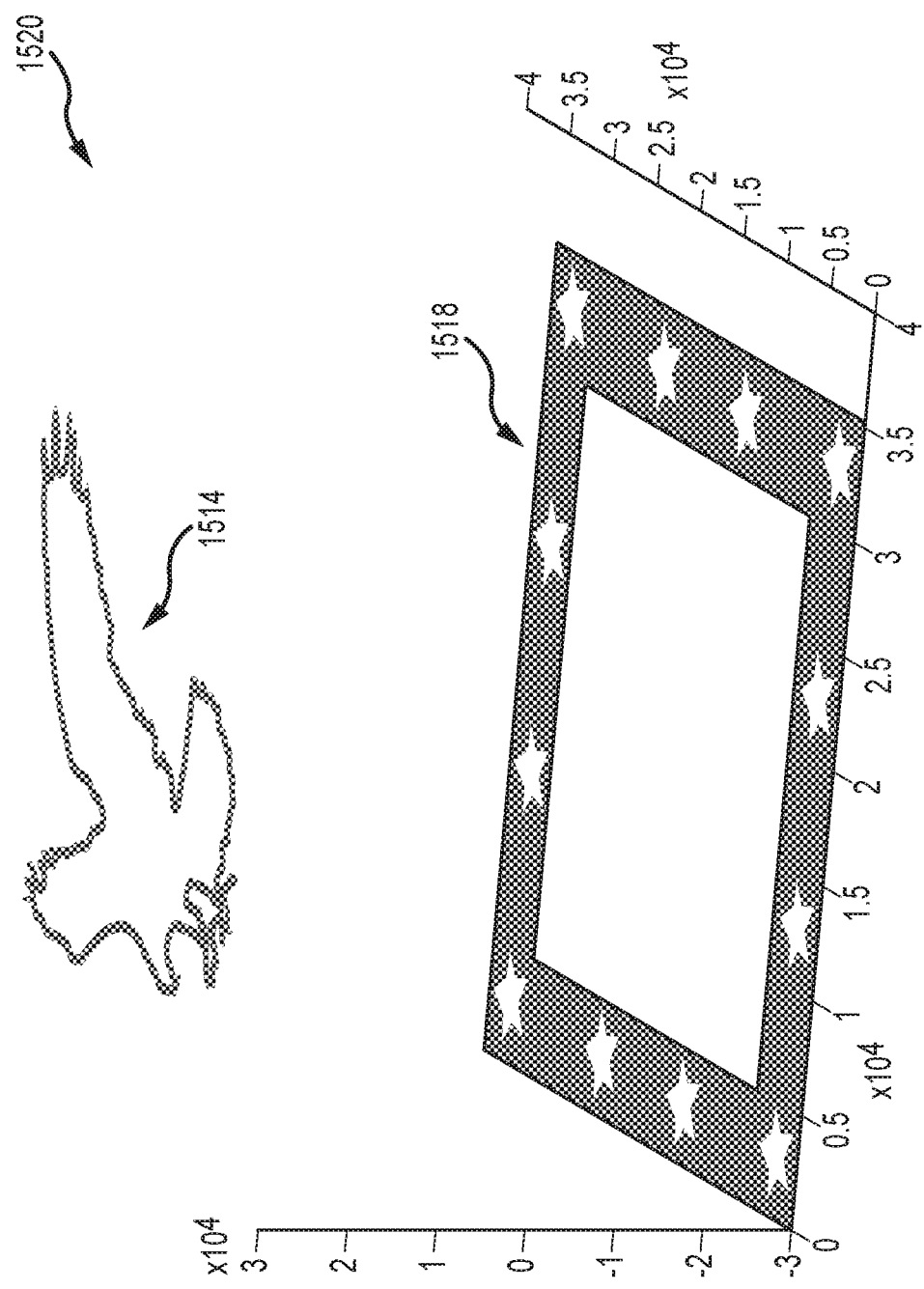

FIGS. 15A and 15B illustrate plots generated and displayed by a preview program (which may be a subroutine of the design program described herein) for previewing likely or predicted results of a design of an array of micro mirrors. Specifically, FIG. 15A illustrates a plot 1510 of a 3D image that may be displayed with a selected image and a particular design of an array of micro mirrors. The plot 1510 illustrates a foreground or first layer image 1514 (e.g., a bird such as a flying eagle) relative to a background or second layer image 1518 (e.g., a colored frame with stars) relative to each other and X and Y coordinates. The plot 1510 previews what a viewer looking directly at or downward at the security device may see via the array of micro mirrors. FIG. 15B illustrates a plot 1520 illustrating the foreground image 1514 and background image 1518 not only relative to the X and Y axes but also relative to the Z axis (e.g., the depth that would be provided by the array of micro mirror design).

The preview program providing the plots 1510 and 1520 takes as input the output file of the design program, with all the mirror positions and normal vector coordinates. The preview program calculates the intersection of the reflected rays (e.g., rays coming straight down and bouncing out of the mirrors to the viewer) with the plane where the image is supposed to (or is designed to) float. With the plots 1510 and 1520 provided by the preview program, the operator or designer can verify the combination of foreground and background images 1514, 1518 provides a desired 3D image or representation as shown in FIGS. 15A and 15B. In this example, an eagle 1514 is floating in a first image plane at +30,000 microns above the mirror plane while the frame 1518 (with stars) is floating in a pushed back second image plane at −30,000 microns (or the two image planes are spaced apart 60,000 microns for the viewer providing a desirable 3D effect). Stated differently, the preview program takes the normal vectors corresponding to the eagle's mirrors and plots the intersection to the plane at 30,000 microns (and does a similar processing for the frame/background image's mirrors and the plane at −30,000 microns).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method of fabricating a security element useful on paper and coin currency and product labels, comprising:
providing a substrate; and
forming an array of micro mirrors on a surface of the substrate,
wherein the array of micro mirrors is configured for receiving ambient light and, in response, displaying an image in a plane spaced a distance apart from the surface of the substrate,
wherein the image comprises a plurality of pixels,
wherein the array of micro mirrors includes for each of the pixels a different set of the micro mirrors each having a reflective surface oriented, in a fixed manner, with a body of each of the micro mirrors rotated about at least one of first and second rotation axes extending through the body, to reflect the ambient light toward a point on the plane corresponding to one of the pixels, wherein each of the different sets concurrently reflect the ambient light to concurrently generate the plurality of pixels, wherein a voxel is created at each of the point on the plane via intersection of two or more beams of the reflected ambient light, and wherein each of the created voxels produces an effect of a point source of light floating above the surface of the substrate in the plane.

2. The method of claim 1, wherein the forming the array of micro mirrors comprises casting the micro mirrors with a mirror tool in contact with the surface of the substrate, wherein the substrate comprises a clear, energy-cured polymer.

3. The method of claim 1, wherein the forming the array of micro mirrors includes metallization of surfaces of the micro mirrors and wherein the metallization applies a layer of aluminum, gold, or silver to form reflective surfaces.

4. The method of claim 3, wherein the forming the array of micro mirrors includes, prior to the metallization of the surfaces of the micro mirrors, embossing the surface of the substrate to form the surfaces of the micro mirrors and wherein the surface of the substrate includes an embossable coating or layer.

5. The method of claim 1, wherein the forming the array of micro mirrors comprises filling in recessed surfaces associated with the micro mirrors with a filler comprising at least one of an ultraviolet (UV) varnish, an e-beam solvent, and a water-based varnish and wherein the filler has a refractive index of at least 1.55, whereby at least a portion of the received ambient light at extreme angles is reflected to sharpen the displayed image.

6. A method of fabricating a security element useful on paper and coin currency and product labels, comprising:
providing a substrate; and
forming an array of micro mirrors on a surface of the substrate,
wherein the array of micro mirrors is configured for receiving ambient light and, in response, displaying a first image and a second image in a plane spaced a distance apart from the surface of the substrate at first and second viewing angles, respectively,
wherein the first and second images each comprises a plurality of pixels, and
wherein the array of micro mirrors includes for each of the pixels a unique set of the micro mirrors each having a reflective surface rigidly oriented, by rotating a body of each of the micro mirrors about at least one of two rotation axes extending through the body, to reflect the ambient light away from the substrate toward a point on the plane corresponding to one of the pixels,
wherein each of the unique sets of the micro mirrors includes a number of the micro mirrors in the range of 2 to 40, and
wherein the reflected ambient light from the number of the micro mirrors intersects at the point corresponding to the one of the pixels to create a voxel, whereby the voxel acts like a point light source positioned in the plane at the point corresponding to the one of the pixels.

7. The method of claim 6, wherein the forming the array of micro mirrors comprises casting the micro mirrors with a mirror tool in contact with the surface of the substrate.

8. The method of claim 7, wherein the substrate comprises a clear, energy-cured polymer.

9. The method of claim 6, wherein the forming the array of micro mirrors includes metallization of surfaces of the micro mirrors and wherein the metallization applies a layer of aluminum, gold, or silver to form reflective surfaces.

10. The method of claim 9, wherein the forming the array of micro mirrors includes, prior to the metallization of the surfaces of the micro mirrors, embossing the surface of the substrate to form the surfaces of the micro mirrors.

11. The method of claim 10, wherein the surface of the substrate includes an embossable coating or layer.

12. The method of claim 6, wherein the forming the array of micro mirrors comprises filling in recessed surfaces associated with the micro mirrors with a filler comprising at least one of an ultraviolet (UV) varnish, an e-beam solvent, and a water-based varnish and wherein the filler has a refractive index of at least 1.55, whereby at least a portion of the received ambient light at extreme angles is reflected to sharpen the displayed image.

* * * * *